US008906292B2

United States Patent
Bewlay et al.

(10) Patent No.: US 8,906,292 B2
(45) Date of Patent: *Dec. 9, 2014

(54) CRUCIBLE AND FACECOAT COMPOSITIONS

(75) Inventors: Bernard Patrick Bewlay, Niskayuna, NY (US); Stephen Bancheri, Niskayuna, NY (US); Joan McKiever, Niskayuna, NY (US); Brian Ellis, Niskayuna, NY (US); Robert A. Giddings, Slingerlands, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,656

(22) Filed: Jul. 27, 2012

(65) Prior Publication Data

US 2014/0030138 A1    Jan. 30, 2014

(51) Int. Cl.
*B22D 41/02* (2006.01)
*C04B 35/626* (2006.01)
*F27B 14/10* (2006.01)
*C04B 35/44* (2006.01)
*F27D 1/00* (2006.01)
*C04B 35/117* (2006.01)
*B22D 41/00* (2006.01)
*B28B 1/00* (2006.01)

(52) U.S. Cl.
CPC ......... *B22D 41/02* (2013.01); *C04B 2235/3217* (2013.01); *C04B 2235/3222* (2013.01); *C04B 2235/6028* (2013.01); *C04B 35/6263* (2013.01); *F27B 14/10* (2013.01); *C04B 2235/3418* (2013.01); *C04B 35/44* (2013.01); *C04B 2235/5436* (2013.01); *C04B 35/6269* (2013.01); *F27D 1/0006* (2013.01); *C04B 35/117* (2013.01); *C04B 2235/80* (2013.01); *B22D 41/00* (2013.01); *C04B 2235/3208* (2013.01); *B28B 1/008* (2013.01)
USPC ............................ 266/286; 266/275; 432/265

(58) Field of Classification Search
CPC ........................................................ B22D 41/02
USPC ............................ 266/280, 286, 275; 432/265
See application file for complete search history.

(56) References Cited

U.S. PATENT DOCUMENTS 2,781,261 A    2/1957    Kamlet
2,837,426 A    6/1958    Kamlet
(Continued)

FOREIGN PATENT DOCUMENTS

CA    2057373    12/1991
CN    1060683    4/1992
(Continued)

OTHER PUBLICATIONS

Machine translation of the specification and claims of DE 199 08 952 A1, Sep. 1999.*

(Continued)

*Primary Examiner* — Scott Kastler
(74) *Attorney, Agent, or Firm* — Heslin Rothenberg Farley & Mesiti P.C.

(57) ABSTRACT

Crucible compositions and methods of using the crucible compositions to melt titanium and titanium alloys. More specifically, crucible compositions having intrinsic facecoats that are effective for melting titanium and titanium alloys for use in casting titanium-containing articles. Further embodiments are titanium-containing articles made from the titanium and titanium alloys melted in the crucible compositions. Another embodiment is a crucible curing device and methods of use thereof.

36 Claims, 11 Drawing Sheets

(56) References Cited

U.S. PATENT DOCUMENTS

| | | | |
|---|---|---|---|
| 3,084,060 A | 4/1963 | Baer et al. | |
| 3,180,632 A | 4/1965 | Katz et al. | |
| 3,188,231 A * | 6/1965 | Jastrzebski | 428/697 |
| 3,565,643 A | 2/1971 | Bergna | |
| 3,660,075 A | 5/1972 | Harbur et al. | |
| 3,676,161 A | 7/1972 | Yates | |
| 3,734,480 A | 5/1973 | Zanis et al. | |
| 3,787,143 A | 1/1974 | Carbonnel et al. | |
| 3,961,995 A | 6/1976 | Alliot et al. | |
| 3,969,195 A | 7/1976 | Dötzer et al. | |
| 4,028,096 A | 6/1977 | Banker et al. | |
| 4,040,845 A | 8/1977 | Richerson et al. | |
| 4,148,204 A | 4/1979 | Dötzer et al. | |
| 4,356,152 A | 10/1982 | Berkman et al. | |
| 4,661,316 A | 4/1987 | Hashimoto et al. | |
| 4,703,806 A | 11/1987 | Lassow et al. | |
| 4,710,348 A | 12/1987 | Brupbacher et al. | |
| 4,723,764 A | 2/1988 | Mizuhara | |
| 4,740,246 A | 4/1988 | Feagin | |
| 4,746,374 A | 5/1988 | Froes et al. | |
| 4,793,971 A | 12/1988 | Eckert et al. | |
| 4,802,436 A | 2/1989 | Wilson et al. | |
| 4,808,372 A | 2/1989 | Koczak et al. | |
| 4,892,693 A | 1/1990 | Perrotta et al. | |
| 4,893,743 A | 1/1990 | Eylon et al. | |
| 4,919,886 A | 4/1990 | Venkataraman et al. | |
| 4,951,929 A | 8/1990 | Schwarz et al. | |
| 4,966,225 A | 10/1990 | Johnson et al. | |
| 4,996,175 A | 2/1991 | Sturgis | |
| 5,011,554 A | 4/1991 | Fleischer | |
| 5,098,484 A | 3/1992 | Eylon et al. | |
| 5,098,653 A | 3/1992 | Shyh-Chin | |
| 5,102,450 A | 4/1992 | Huang | |
| 5,152,853 A | 10/1992 | Fleischer | |
| 5,190,603 A | 3/1993 | Nazmy et al. | |
| 5,205,984 A | 4/1993 | Rowe | |
| 5,263,530 A | 11/1993 | Colvin | |
| 5,284,620 A | 2/1994 | Larsen, Jr. | |
| 5,287,910 A | 2/1994 | Colvin et al. | |
| 5,296,055 A | 3/1994 | Matsuda | |
| 5,297,615 A | 3/1994 | Aimone et al. | |
| 5,299,619 A | 4/1994 | Chandley et al. | |
| 5,305,817 A | 4/1994 | Borisov et al. | |
| 5,346,184 A | 9/1994 | Ghosh | |
| 5,350,466 A | 9/1994 | Larsen, Jr. et al. | |
| 5,354,351 A | 10/1994 | Kampe et al. | |
| 5,366,570 A | 11/1994 | Mazur et al. | |
| 5,368,657 A | 11/1994 | Anderson et al. | |
| 5,372,663 A | 12/1994 | Shibue et al. | |
| 5,407,001 A | 4/1995 | Yasrebi et al. | |
| 5,424,027 A | 6/1995 | Eylon | |
| 5,427,173 A | 6/1995 | Das et al. | |
| 5,429,778 A | 7/1995 | Patel et al. | |
| 5,443,892 A | 8/1995 | Holcombe et al. | |
| 5,453,243 A | 9/1995 | Hansen et al. | |
| 5,476,679 A | 12/1995 | Lewis et al. | |
| 5,503,798 A | 4/1996 | Singheiser et al. | |
| 5,580,403 A | 12/1996 | Mazur et al. | |
| 5,602,197 A | 2/1997 | Johnson et al. | |
| 5,603,759 A * | 2/1997 | Burkhart | 106/692 |
| 5,626,179 A | 5/1997 | Choudhury et al. | |
| 5,678,298 A | 10/1997 | Colvin et al. | |
| 5,749,937 A | 5/1998 | Detering et al. | |
| 5,766,329 A | 6/1998 | LaSalle et al. | |
| 5,776,617 A | 7/1998 | Brady et al. | |
| 5,823,243 A | 10/1998 | Kelly | |
| 5,839,504 A | 11/1998 | Matsuda | |
| 5,908,516 A | 6/1999 | Nguyen-Dinh | |
| 5,942,057 A | 8/1999 | Hanamura et al. | |
| 5,944,088 A | 8/1999 | Feagin | |
| 5,950,706 A | 9/1999 | Choudhury et al. | |
| 5,981,083 A | 11/1999 | Colvin et al. | |
| 5,997,802 A | 12/1999 | Holcombe, Jr. et al. | |
| 6,136,094 A | 10/2000 | Yamaji et al. | |
| 6,174,387 B1 | 1/2001 | Bellows et al. | |
| 6,174,495 B1 | 1/2001 | Nishikiori | |
| 6,250,366 B1 | 6/2001 | Choudhury et al. | |
| 6,283,195 B1 | 9/2001 | Chandley et al. | |
| 6,284,389 B1 | 9/2001 | Jones et al. | |
| 6,352,101 B1 | 3/2002 | Ghosh et al. | |
| 6,355,362 B1 | 3/2002 | Jones et al. | |
| 6,380,114 B1 * | 4/2002 | Brandy | 501/128 |
| 6,408,929 B2 | 6/2002 | Choudhury et al. | |
| 6,409,963 B1 | 6/2002 | Gohres et al. | |
| 6,425,504 B1 | 7/2002 | Besser et al. | |
| 6,443,212 B1 | 9/2002 | Choudhury et al. | |
| 6,488,073 B1 | 12/2002 | Blenkinsop et al. | |
| 6,524,407 B1 | 2/2003 | Paul et al. | |
| 6,596,963 B2 | 7/2003 | Kelly | |
| 6,660,109 B2 | 12/2003 | Hajaligol et al. | |
| 6,669,791 B2 | 12/2003 | Tetsui et al. | |
| 6,705,385 B2 | 3/2004 | Ray et al. | |
| 6,723,279 B1 | 4/2004 | Withers et al. | |
| 6,746,508 B1 | 6/2004 | Deevi et al. | |
| 6,755,239 B2 | 6/2004 | Ray et al. | |
| 6,776,214 B2 | 8/2004 | Ray et al. | |
| 6,799,626 B2 | 10/2004 | Ray et al. | |
| 6,868,814 B2 | 3/2005 | Baur et al. | |
| 6,923,934 B2 | 8/2005 | Nishikiori | |
| 7,157,148 B2 | 1/2007 | Takai et al. | |
| 7,360,579 B2 | 4/2008 | Renkel et al. | |
| 7,389,808 B2 | 6/2008 | Renkel et al. | |
| 7,389,809 B2 | 6/2008 | Renkel et al. | |
| 7,761,969 B2 | 7/2010 | Bewlay et al. | |
| 8,062,581 B2 | 11/2011 | Bewlay et al. | |
| 8,075,713 B2 | 12/2011 | Renkel | |
| 8,136,572 B2 | 3/2012 | Renkel | |
| 8,136,573 B2 | 3/2012 | Renkel | |
| 8,167,023 B2 | 5/2012 | Renkel | |
| 8,579,013 B2 * | 11/2013 | Bewlay et al. | 164/529 |
| 2002/0108679 A1 | 8/2002 | Chandley et al. | |
| 2003/0051780 A1 | 3/2003 | Blenkinsop et al. | |
| 2004/0045644 A1 | 3/2004 | Guther et al. | |
| 2005/0084407 A1 | 4/2005 | Myrick | |
| 2007/0107202 A1 | 5/2007 | Das | |
| 2007/0199676 A1 | 8/2007 | Wolter | |
| 2007/0280328 A1 | 12/2007 | Lee et al. | |
| 2008/0003453 A1 | 1/2008 | Ogren | |
| 2008/0156147 A1 | 7/2008 | Kelly et al. | |
| 2008/0156453 A1 | 7/2008 | Kelly et al. | |
| 2008/0260608 A1 | 10/2008 | Rancoule | |
| 2008/0290568 A1 | 11/2008 | Bewlay et al. | |
| 2009/0050284 A1 | 2/2009 | Seserko | |
| 2009/0133850 A1 | 5/2009 | Kelly et al. | |
| 2009/0169415 A1 | 7/2009 | Chikugo et al. | |
| 2009/0321038 A1 | 12/2009 | Renkel | |
| 2010/0089500 A1 | 4/2010 | Renkel | |
| 2010/0139550 A1 | 6/2010 | Aichele et al. | |
| 2011/0091324 A1 | 4/2011 | Holzschuh | |
| 2011/0094705 A1 | 4/2011 | Kelly et al. | |
| 2011/0203761 A1 | 8/2011 | Renkel | |
| 2013/0084190 A1 | 4/2013 | Bewlay et al. | |
| 2013/0108459 A1 * | 5/2013 | Bewlay | 416/241 R |
| 2013/0210320 A1 | 8/2013 | Bewlay et al. | |
| 2013/0224066 A1 * | 8/2013 | Bewlay et al. | 420/417 |
| 2013/0248061 A1 | 9/2013 | Kelly et al. | |
| 2013/0251537 A1 | 9/2013 | Weimer et al. | |

FOREIGN PATENT DOCUMENTS

| | | |
|---|---|---|
| CN | 101829770 | 9/2010 |
| DE | 19752777 A1 | 7/1999 |
| DE | 19908952 A1 | 9/1999 |
| DE | 10125129 A1 | 1/2003 |
| DE | 102009027019 A1 | 11/2010 |
| EP | 0096985 A1 | 12/1983 |
| EP | 0238758 A2 | 9/1987 |
| EP | 0529594 A1 | 3/1993 |
| EP | 0530968 A1 | 3/1993 |
| EP | 0560070 A1 | 9/1993 |
| EP | 0753593 A1 | 1/1997 |
| EP | 1061149 A1 | 12/2000 |
| EP | 1797977 A2 | 6/2007 |
| GB | 569852 | 6/1945 |

(56) References Cited

FOREIGN PATENT DOCUMENTS

| | | |
|---|---|---|
| GB | 783411 A | 9/1957 |
| GB | 2248071 A | 3/1992 |
| GB | 2440334 A | 1/2008 |
| JP | 54157780 | 12/1979 |
| JP | 61129568 A | 6/1986 |
| JP | 01139988 A | 6/1989 |
| JP | 01184392 A | 7/1989 |
| JP | 03282187 A | 12/1991 |
| JP | 0499840 A | 3/1992 |
| JP | 06009290 | 1/1994 |
| JP | 06179930 | 6/1994 |
| JP | 06269927 A | 9/1994 |
| JP | 0789789 A | 4/1995 |
| JP | 10204555 A | 8/1998 |
| JP | 11116399 A | 4/1999 |
| JP | 2001208481 A | 8/2001 |
| JP | 2003056988 A | 2/2003 |
| WO | WO8606366 A1 | 11/1986 |
| WO | WO8803520 A1 | 5/1988 |
| WO | WO8910982 A1 | 11/1989 |
| WO | WO9013377 A1 | 11/1990 |
| WO | WO9630552 A1 | 10/1996 |
| WO | WO9832557 A1 | 7/1998 |
| WO | WO9927146 A1 | 6/1999 |
| WO | WO0044959 A1 | 8/2000 |
| WO | WO0067541 A1 | 11/2000 |
| WO | WO2008049452 A1 | 5/2008 |
| WO | WO2011048423 A1 | 4/2011 |

OTHER PUBLICATIONS

U.S. Appl. No. 13/598,164, filed Aug. 29, 2012, titled Calcium Titanate Containing Mold Compositions and Methods for Casting Titanium and Titanium Aluminide Alloys.

U.S. Appl. No. 13/752,880, filed Jan. 29, 2013, titled Calcium Hexaluminate—Containing Mold and Facecoat Compositions and Methods for Casting Titanium and Titanium Aluminide Alloys.

PCT Search Report and Written Opinion dated Jan. 2, 2014, issued in connection with corresponding WO Patent Application No. PCT/US2013/050850.

\* cited by examiner

- 705 COMBINING CALCIUM ALUMINATE WITH A LIQUID TO PRODUCE A SLURRY OF CALCIUM ALUMINATE IN THE LIQUID
- 707 ADDING OXIDE PARTICLES INTO THE SLURRY (OPTIONAL)
- 710 INTRODUCING THE SLURRY INTO A CRUCIBLE MOLD THAT CONTAINS A FUGITIVE PATTERN
- 715 ALLOWING THE SLURRY TO CURE IN THE CRUCIBLE MOLD TO FORM A CRUCIBLE

- 725 OBTAINING AN INVESTMENT CASTING CRUCIBLE COMPOSITION COMPRISING CALCIUM ALUMINATE AND ALUMINUM OXIDE
- 730 POURING THE INVESTMENT CASTING CRUCIBLE COMPOSITION INTO A VESSEL CONTAINING A FUGITIVE PATTERN
- 735 CURING THE INVESTMENT CASTING CRUCIBLE COMPOSITION
- 740 REMOVING THE FUGITIVE PATTERN FROM THE CRUCIBLE
- 745 FIRING THE CRUCIBLE
- 750 PREHEATING THE MOLD TO A MOLD CASTING TEMPERATURE
- 755 POURING MOLTEN TITANIUM OR TITANIUM ALLOY INTO THE HEATED MOLD
- 760 SOLIDIFYING THE MOLTEN TITANIUM OR TITANIUM ALLOY AND FORMING A SOLIDIFIED TITANIUM OR TITANIUM ALLOY CASTING
- REMOVING THE SOLIDIFIED TITANIUM ALLOY CASTING FROM THE MOLD

CRUCIBLE AND FACECOAT COMPOSITIONS

BACKGROUND

Modern gas or combustion turbines must satisfy the highest demands with respect to reliability, weight, power, economy, and operating service life. In the development of such turbines, the material selection, the search for new suitable materials, as well as the search for new production methods, among other things, play an important role in meeting standards and satisfying the demand.

The materials used for gas turbines may include titanium alloys, nickel alloys (also called super alloys) and high strength steels. For aircraft engines, titanium alloys are generally used for compressor parts, nickel alloys are suitable for the hot parts of the aircraft engine, and the high strength steels are used, for example, for compressor housings and turbine housings. The highly loaded or stressed gas turbine components, such as components for a compressor for example, are typically forged parts. Components for a turbine, on the other hand, are typically embodied as investment cast parts.

Although investment casting is not a new process, the investment casting market continues to grow as the demand for more intricate and complicated parts increase. Because of the great demand for high quality, precision castings, there continuously remains a need to develop new ways to make investment castings more quickly, efficiently, cheaply and of higher quality.

Conventional crucibles are not suitable for casting reactive alloys, such as titanium alloys. One reason is because there is a reaction between molten titanium and the crucible. Any reaction between the molten alloy and the crucible will deteriorate the properties of the final casting. The deterioration can be as simple as poor surface finish due to gas bubbles, or in more serious cases, the chemistry, microstructure, and properties of the casting can be compromised.

The challenge has been to produce a crucible that does not react significantly with titanium and titanium aluminide alloys. In this regard, few if any prior poured ceramic investment compounds exist that meet the requirements for structural titanium and titanium aluminide alloys. Therefore, there is a need for a ceramic crucible that does not react significantly with titanium and titanium aluminide alloys. Approaches have been adopted previously with ceramic shell crucibles for melting titanium alloys. In the prior examples, in order to reduce the limitations of the conventional investment crucible compounds, several additional crucible or mold materials have been developed. For example, a mold investment compound was developed of an oxidation-expansion type in which magnesium oxide or zirconia was used as a main component and metallic zirconium was added to the main constituent to compensate for the shrinkage due to solidification of the cast metal. There is thus also a need for simple and reliable melting and investment casting methods which allow easy melting of metals or metallic alloys in an investment crucible that does not react significantly with the metal or metallic alloy.

Induction melting generally involves heating a metal in a crucible made from a non-conductive refractory alloy oxide until the charge of metal within the crucible is melted to liquid form. When melting highly reactive metals such as titanium or titanium alloys, vacuum induction melting using cold wall or graphite crucibles is typically employed in preference to oxide based ceramic crucibles.

Difficulties can arise when melting highly reactive alloys, such as titanium alloys, as a result of the reactivity of the elements in the alloy at the temperatures needed for melting. While most induction melting systems use refractory alloy oxides for crucibles in the induction furnace, alloys such as titanium aluminide (TiAl) are so highly reactive that they can attack the crucible and contaminate the titanium alloy. For example, ceramic crucibles, such as alumina-, magnesia-, and silica-containing crucibles, are typically avoided because the highly reactive alloys can react with the crucible and contaminate the titanium alloy with oxygen. Similarly, if graphite crucibles are employed, both the titanium and titanium aluminide based alloys can dissolve large quantities of carbon from the crucible into the titanium alloy, thereby resulting in contamination. Such contamination results in the loss of mechanical properties of the titanium alloy.

Cold crucible melting offers metallurgical advantages for the processing of the highly reactive alloys described previously, it also has a number of technical and economic limitations including low superheat, yield losses due to skull formation, high power requirements, and a limited melt capacity. These limitations can restrict its commercial viability.

Accordingly, there remains a need for ceramic crucibles for use in melting highly reactive alloys that are less susceptible to contamination and pose fewer technical and economic limitations than current applications.

SUMMARY

Aspects of the present system provide crucible compositions, methods of melting, methods of casting, and cast articles that overcome the limitations of the conventional techniques are disclosed. Though some aspect of the present description may be directed toward the fabrication of components for the aerospace industry, for example, engine turbine blades, aspects of the present system may be employed in the fabrication of any component in any industry, in particular, those components containing titanium and/or titanium alloys.

One embodiment is a crucible for melting titanium and titanium alloys, comprising: a bulk comprising a calcium aluminate cement, said calcium aluminate cement comprising calcium monoaluminate; and a cavity for melting titanium and titanium alloys therein. In another embodiment, the crucible can further include an intrinsic facecoat that is disposed about 10 microns to about 450 microns between the bulk and the cavity, wherein said intrinsic facecoat comprises a calcium aluminate cement comprising calcium monoaluminate. In another embodiment, the calcium aluminate cement can further comprise calcium dialuminate, mayenite, or both calcium dialuminate and mayenite.

One embodiment is a crucible for melting titanium and titanium alloys, comprising: a calcium aluminate cement comprising calcium monoaluminate, calcium dialuminate, and mayenite, wherein the crucible has an intrinsic facecoat of about 10 microns to about 450 microns between the bulk of the crucible and the crucible cavity. In another embodiment, the facecoat is a continuous intrinsic facecoat. The facecoat is defined as the region of the crucible adjacent to the internal surface, or crucible cavity in the crucible. In order to be more effective, the facecoat is continuous. The region behind the facecoat and further away from the crucible cavity is referred to as the bulk of the crucible. In a further embodiment, the crucible as recited further comprises silica, for example, colloidal silica.

The crucible, in one example, comprises the bulk of the crucible and an intrinsic facecoat, with the bulk of the crucible and the intrinsic facecoat having different compositions, and the intrinsic facecoat comprising calcium aluminate with a particle size of less than about 50 microns. In another embodiment, the crucible comprises the bulk of the crucible and an intrinsic facecoat, wherein the bulk of the crucible and the intrinsic facecoat have different compositions and wherein the bulk of the crucible comprises alumina particles larger than about 50 microns. The crucible, in another example, comprises the bulk of the crucible and an intrinsic facecoat, wherein the bulk of the crucible comprises alumina particles larger than about 50 microns and the intrinsic facecoat comprises calcium aluminate particles less than about 50 microns in size.

In certain embodiments, the intrinsic facecoat has, by weight fraction, at least 20 percent more calcium monoaluminate than does the bulk of the crucible. In one embodiment, the intrinsic facecoat has, by weight fraction, at least 20 percent less alumina than does the bulk of the crucible. In another embodiment, the intrinsic facecoat has, by weight fraction, at least 20 percent more calcium aluminate, at least 20 percent less alumina, and at least 50 percent less mayenite than does the bulk of the crucible.

The weight fraction of calcium monoaluminate in the intrinsic facecoat is, in one example, more than 0.60 and the weight fraction of mayenite is less than 0.10. In one embodiment, the calcium monoaluminate in the bulk of the crucible comprises a weight fraction of about 0.05 to 0.95, and the calcium monoaluminate in the intrinsic facecoat is about 0.10 to 0.90. In another embodiment, the calcium dialuminate in the bulk of the crucible comprises a weight fraction of about 0.05 to about 0.80, and the calcium dialuminate in the intrinsic facecoat is about 0.05 to 0.90. In yet another embodiment, the mayenite in the bulk of the crucible composition comprises a weight fraction of about 0.01 to about 0.30, and the mayenite in the intrinsic facecoat is about 0.001 to 0.05. In a particular embodiment, the calcium monoaluminate in the bulk of the crucible comprises a weight fraction of about 0.05 to 0.95, and the calcium monoaluminate in the intrinsic facecoat is about 0.1 to 0.90; the calcium dialuminate in the bulk of the crucible comprises a weight fraction of about 0.05 to about 0.80, and the calcium dialuminate in the intrinsic facecoat is about 0.05 to 0.90; and wherein the mayenite in the bulk of the crucible composition comprises a weight fraction of about 0.01 to about 0.30, and the mayenite in the intrinsic facecoat is about 0.001 to 0.05.

In one example, the crucible further comprises aluminum oxide particles in the bulk of the crucible that are less than about 500 microns in outside dimension. In one example, the aluminum oxide particles comprise from about 40% by weight to about 68% by weight of the composition used to make the crucible. These aluminum oxide particles may be hollow. In another embodiment, the calcium aluminate cement comprises more than 30% by weight of the composition used to make the crucible. In one embodiment, the crucible further comprises more than about 10% by weight and less than about 50% by weight of the crucible composition in calcium oxide.

In one example, the crucible further comprises aluminum oxide particles, magnesium oxide particles, calcium oxide particles, zirconium oxide particles, titanium oxide particles, silicon oxide particles, or compositions thereof.

The percentage of solids in an initial calcium aluminate-liquid cement mixture used to make the crucible is, in one example, from about 60 to about 80%. In another example, the percentage of solids in the final calcium aluminate-liquid cement mixture with the large scale alumina, used to make the crucible, is from about 65% to about 90%. The percentage of solids is defined as the total solids in the mix divided by the total mass of the liquid and solids in the mix, described as a percentage.

One aspect of the present system is a titanium-containing article formed from titanium or titanium alloys melted in the crucible. The article, in one example, comprises a titanium aluminide-containing turbine blade. In one aspect, the present article is the crucible as recited herein, wherein the crucible is used to melt the titanium or titanium alloy that forms a titanium-containing article. In one related embodiment, the titanium-containing article comprises a titanium aluminide-containing turbine blade.

One aspect is a facecoat composition of a crucible that is used for melting a titanium alloy for use in casting a titanium-containing article, the facecoat composition comprising: calcium monoaluminate, calcium dialuminate, and mayenite, wherein the facecoat composition is an intrinsic facecoat, is about 10 microns to about 450 microns thick, and is located between the bulk of the crucible and the surface of the crucible that opens to the crucible cavity. The intrinsic facecoat comprises, in one example, calcium aluminate with a particle size of less than about 50 microns. In one embodiment, the intrinsic facecoat composition further comprises silica, for example, colloidal silica.

In one example, the intrinsic facecoat has, by weight fraction, at least 20 percent more calcium aluminate, at least 20 percent less alumina, and at least 50 percent less mayenite than does the bulk of the crucible. The weight fraction of calcium monoaluminate in the intrinsic facecoat is, in one example, more than 0.60 and the weight fraction of mayenite is less than 0.10. In one embodiment, the calcium monoaluminate in the intrinsic facecoat comprises a weight fraction of 0.10 to 0.90; the calcium dialuminate in the intrinsic facecoat comprises a weight fraction of 0.05 to 0.90; and the mayenite in the intrinsic facecoat comprises a weight fraction of 0.001 to 0.05.

One aspect of the present technique is a method for forming a melting crucible for melting titanium and titanium alloys useful in casting a titanium-containing article, the method comprising: combining calcium aluminate with a liquid to produce a slurry of calcium aluminate, wherein the percentage of solids in the initial calcium aluminate/liquid mixture is about 60% to about 80% and the viscosity of the slurry is about 10 to about 250 centipoise; adding oxide particles into the slurry such that the solids in the final calcium aluminate/liquid mixture with the large-scale (greater than 50 microns) oxide particles is about 65% to about 90%; introducing the slurry into a crucible mold cavity that contains a fugitive pattern; and allowing the slurry to cure in the crucible mold cavity to form a crucible for use in melting titanium and titanium alloys useful in making a titanium-containing article.

A further aspect is a melting method for titanium and titanium alloys comprising: obtaining a melting crucible composition comprising calcium aluminate and aluminum oxide, wherein the calcium aluminate is combined with a liquid to produce a slurry of calcium aluminate, and wherein the solids in the final calcium aluminate/liquid mixture with the large scale alumina is about 65% to about 90%, and wherein the resulting crucible has an intrinsic facecoat; pouring the melting crucible composition into a vessel containing a fugitive pattern; curing the melting crucible composition; removing the fugitive pattern from the vessel to yield a crucible; preheating the crucible; and melting titanium or a titanium alloy in the heated crucible to produce molten titanium or molten titanium alloy.

A further example is a casting method for titanium and titanium alloys comprising: obtaining a melting crucible composition comprising calcium aluminate and aluminum oxide, wherein the calcium aluminate is combined with a liquid to produce a slurry of calcium aluminate, and wherein the solids in the final calcium aluminate/liquid mixture with the large scale alumina is about 65% to about 90%, and wherein the resulting crucible has an intrinsic facecoat; pouring the melting crucible composition into a vessel containing a fugitive pattern; curing the melting crucible composition; removing the fugitive pattern from the vessel to yield a crucible; preheating the crucible; melting titanium or a titanium alloy in the heated crucible to produce molten titanium or molten titanium alloy; pouring the molten titanium or the molten titanium alloy into a mold; and solidifying the molten titanium or titanium alloy to form a solidified titanium or titanium alloy casting. The solidified titanium or titanium alloy casting can then be removed from the mold. In one embodiment, this method can involve firing the mold prior to delivering the molten titanium or titanium alloy from the crucible into the casting mold. In one embodiment, a titanium or titanium alloy article is provided that is made by the melting and casting methods as taught herein.

One aspect of the present system is a crucible composition for melting titanium or titanium alloys, comprising: a calcium aluminate cement comprising calcium monoaluminate, calcium dialuminate, and mayenite. In one embodiment, the crucible composition further comprises hollow particles of aluminum oxide. Another aspect is a titanium-containing article melting-crucible composition comprising calcium aluminate. For instance, an aspect of the present system may be uniquely suited to providing crucible compositions to be used in crucibles for melting titanium or titanium alloys for use in casting titanium-containing and/or titanium alloy-containing articles or components, for example, titanium containing turbine blades.

Another aspect is a crucible curing device comprising: a base comprising a chamber for holding a crucible mold therein; an effector arm for inserting and removing a removable crucible cavity pattern into and out of the chamber, said effector arm comprising an adaptor portion for removably coupling the crucible cavity pattern to a terminal end of the effector arm; and a support for supporting and positioning the effector arm at a desired location above the chamber, wherein said crucible curing device is effective to produce a crucible that provides the required thermal shock resistance for melting titanium or titanium alloys for use in forming a titanium-containing article. In one embodiment, the melting of the titanium or titanium alloys can be at a temperature of more than 1500° C., and up to 1700° C. for at least 1 second and for times up to 5 minutes, and in a particular embodiment for between about 5-30 seconds.

As used herein, the term "removable crucible cavity pattern" refers to any pattern that is used to form the cavity of a cured crucible. The term "removable crucible cavity pattern" is used interchangeably herein with the term "fugitive pattern," "wax pattern," and the like.

An important property of a melting crucible is its ability to withstand thermal gradients during heating of the crucible and the alloy charge in the crucible during the melting cycle; this property can be referred to as the thermal shock resistance. The thermal gradients that occur through the walls of the crucible in the axial and radial directions, and the change in these thermal gradients as a function of time during the melting cycle, generate stresses in the walls of the crucible that can lead to cracking of the crucible. When cracks occur in the crucible walls, the melt can leak out of the crucible, and this can lead to a casting failure.

In one embodiment, the crucible wall thickness is configured so that it does not vary by more than 30 percent, because the wall thickness affects the thermal performance of the crucible. Specifically, the wall thickness and the properties of the crucible wall, such as the elastic modulus, strength, thermal conductivity, and thermal expansion coefficient, control the thermal shock resistance of the crucible. If the crucible wall thickness is not uniform throughout all the walls of the crucible then the crucible walls will not heat up uniformly and this can lead to undesirable thermal stresses in the walls of the crucible and these stresses can lead to cracking of the crucible during melting before casting and leakage of the melt from the crucible.

If the crucible wall thickness is not uniform throughout all the walls of the crucible then the elastic stiffness and the fracture stress of the wall of the crucible will vary, and the mechanical response of the crucible wall to thermal cycle that the crucible experiences during melting will vary and this can lead to undesirable thermal stresses in the walls of the crucible and these stresses can lead to cracking of the crucible during melting before casting and leakage of the melt from the crucible.

As noted, in one embodiment, wall thickness of the crucible does not vary by more than 30 percent throughout the full volume of the crucible. In a particular embodiment, wall thickness of the crucible does not vary by more than 20 percent throughout the full volume of the crucible. In another particular embodiment, wall thickness of the crucible does not vary by more than 15 percent throughout the full volume of the crucible.

A further aspect is a method for producing a crucible for melting titanium or titanium alloys for use in forming a titanium-containing article, said method comprising: providing a crucible curing device; positioning a crucible mold in the chamber of the crucible curing device, said crucible mold comprising a crucible mold cavity; introducing a slurry of calcium aluminate into the crucible mold cavity of the crucible mold positioned in the chamber; and allowing the slurry to cure in the crucible mold cavity to form a crucible for use in melting titanium and titanium alloys for forming a titanium-containing article, wherein said allowing step comprises curing the slurry around the removable crucible cavity pattern, which is inserted into the crucible mold cavity either prior to said introducing step or after said introducing step. In one embodiment, the slurry is produced by the process as follows: combining calcium aluminate with a liquid to produce a slurry of calcium aluminate, wherein the percentage of solids in the initial calcium aluminate/liquid mixture is about 60% to about 80% and the viscosity of the slurry is about 50 to about 150 centipoise; and adding oxide particles into the slurry such that the solids in the final calcium aluminate/liquid mixture with the large-scale oxide particles is about 65% to about 90%.

These and other aspects, features, and advantages of this invention will become apparent from the following detailed description of the various aspects of the present invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the present invention will be readily understood from the following detailed description of aspects of the invention taken in conjunction with the accompanying drawings in which:

FIG. 1A is a cross-sectional view of a crucible that has a bulk and a cavity. FIG. 1B is a cross-sectional view of a crucible that has a bulk, cavity, and an intrinsic facecoat.

FIGS. 2A-2B show alumina particles 110 contained in the crucible, intrinsic facecoat 112 of the crucible, bulk 114 of the crucible, internal surface 116 of the crucible, and fine-scale calcium aluminate cement 120 contained in the crucible.

FIG. 3 shows alumina particles 110a and fine-scale calcium aluminate cement 120 contained in intrinsic facecoat 112 of the crucible. FIG. 3 also shows internal surface 116 of the crucible.

FIGS. 4A-4B are flow charts illustrating various methods in accordance with aspects of the description herein. FIG. 4A shows a flow chart, in accordance with aspects of the disclosure, illustrating a method for forming a crucible for melting titanium and titanium alloys for casting a titanium-containing article. FIG. 4B shows a flow chart, in accordance with aspects of the disclosure, illustrating a casting method for titanium and titanium alloys using a crucible to melt the titanium and titanium alloys.

FIG. 7A is a view showing the base of the crucible curing device, the chamber of the base, the effector arm, and the support for the effector arm. FIG. 7B is a close view of a chamber having a crucible mold inserted therein and an effector arm positioned above the chamber and crucible mold. FIG. 7C is a view of the crucible curing device having a crucible mold inserted into the chamber of the base of the device, with the effector arm positioned above the chamber and crucible mold. The position of the effector arm controls the position of the pattern in the crucible mold cavity. The position of the pattern in the crucible mold cavity controls the crucible wall thickness and the uniformity of thickness of the crucible walls. In one embodiment, the crucible wall thickness does not vary by more than 30 percent, because the wall thickness affects the thermal performance of the crucible. Specifically, the wall thickness and the properties of the crucible wall, such as the elastic modulus, strength, and thermal expansion coefficient, control the thermal shock resistance of the crucible.

FIGS. 8A and 8B are views showing the removable crucible cavity pattern attached to the end of the effector arm, with the removable crucible cavity pattern being partially inserted into the crucible mold contained in the chamber of the base of the crucible curing device. FIGS. 8C and 8D are views showing the removable crucible cavity pattern completely inserted into the crucible mold contained in the chamber of the base of the crucible curing device.

DETAILED DESCRIPTION

Figure 1A:
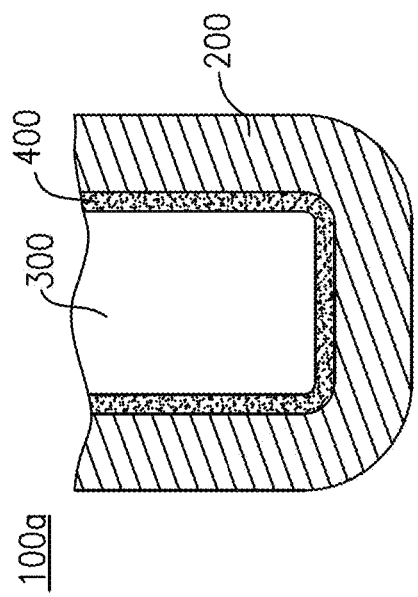
FIGS. 1A-1B are schematic cross-sectional views of one embodiment of a crucible in accordance with the description herein.

The present systems and techniques relate generally to crucible compositions and methods of making crucibles and articles cast from the alloys melted in the crucibles, and, more specifically, to crucible compositions and methods for melting and casting titanium-containing articles, as well as to titanium-containing articles.

The present system provides a new approach for melting titanium and titanium aluminide components, such as, turbine blades or airfoils. Embodiments provide compositions of matter for melting crucibles and melting methods that provide improved titanium and titanium alloy components for example, for use in the aerospace, industrial and marine industry. In some aspects, the crucible composition provides a crucible that contains phases that provide improved crucible strength during crucible making and/or increased resistance to reaction with the metal during melting. The crucibles according to aspects of the present system are capable of preparing molten titanium or titanium alloys for use in casting at high pressure, which is desirable for near-net-shape casting methods. Crucible compositions, for example, containing calcium aluminate cement and alumina particles, and preferred constituent phases, have been identified that provide crucibles with improved properties.

In one aspect, the constituent phases of the crucible comprise calcium monoaluminate. Calcium monoaluminate was found desirable for at least two reasons. First, calcium monoaluminate promotes hydraulic bond formation between the cement particles during the initial stages of crucible making, and this hydraulic bonding is believed to provide crucible strength during crucible construction. Second, calcium monoaluminate experiences a very low rate of reaction with titanium and titanium aluminide based alloys. In a certain embodiment, calcium monoaluminate is provided to the crucible composition of the present system, for example, the investment crucibles, in the form of calcium aluminate cement. In one aspect, the crucible composition comprises a mixture of calcium aluminate cement and alumina, that is, aluminum oxide.

In one aspect, the crucible composition provides minimum reaction with the alloy during melting, and the crucible provides castings with the required component properties. External properties of the casting include features such as shape, geometry, and surface finish. Internal properties of the casting include mechanical properties, microstructure, defects (such as pores and inclusions) below a specified size and within allowable limits.

The crucible of the present disclosure can further include a facecoat, although it need not include such facecoat. More particularly, the facecoat can be an intrinsic facecoat as opposed to an extrinsic facecoat. As used herein, the term "intrinsic facecoat" refers to a facecoat of the crucible that can contain at least one component in common with the parent crucible formulation. By way of contrast, the term "extrinsic facecoat" refers to a facecoat that contains a component that is not part of the parent crucible formulation. As discussed in more detail herein, an intrinsic facecoat of the crucible can be continuous, substantially continuous, or non-continuous.

In one embodiment, the crucible contains a continuous intrinsic facecoat between the bulk of the crucible and the crucible cavity. In a related embodiment, the intrinsic facecoat is about 50 microns to about 450 microns. In certain instances, the intrinsic facecoat comprises of calcium aluminate with a particle size of less than about 50 microns.

The crucible composition may be such that the bulk of the crucible comprises alumina and particles larger than about 50 microns. In a certain embodiment, the intrinsic facecoat has less alumina than the bulk of the crucible, and wherein the facecoat has more calcium aluminate than the bulk of the crucible.

The percentage of solids in the initial calcium aluminate-liquid cement mix, and the solids in the final calcium aluminate-liquid cement mix are a feature. In one example, the percentage of solids in the initial calcium aluminate-liquid cement mix is from about 60% to about 80%. In one example, the percentage of solids in the initial calcium aluminate-liquid cement mix is from about 60% to about 80%. In another example, the solids in the final calcium aluminate-liquid cement mix with the large scale alumina (>100 microns) alumina particles is from about 75% to about 90%. The initial calcium aluminate cement and the fine-scale (less than 10 micron) alumina are mixed with water to provide a uniform and homogeneous slurry; the final crucible mix is formed by adding large-scale (greater than 100 microns) alumina to the initial slurry and mixing for between 2 and 15 minutes to achieve a uniform mix.

The crucible composition of one aspect provides for low-cost melting and casting of titanium aluminide (TiAl) turbine blades, for example, TiAl low pressure turbine blades. The crucible composition may provide the ability to cast near-net-shape parts that require less machining and/or treatment than parts made using conventional shell crucibles and gravity casting techniques. As used herein, the expression "near-net-shape" implies that the initial production of an article is close to the final (net) shape of the article, reducing the need for further treatment, such as, extensive machining and surface finishing. As used herein, the term "turbine blade" refers to both steam turbine blades and gas turbine blades.

Accordingly, the present system addresses the challenges of producing a crucible, for example, an investment crucible, that does not react significantly with titanium and titanium aluminide alloys. In addition, according to some aspects, the strength and stability of the crucible allow high pressure casting approaches, such as centrifugal casting. One of the technical advantages is that, in one aspect, the present system improves the structural integrity of net shape casting that can be generated, for example, from calcium aluminate cement and alumina investment crucibles. The higher component strength, for example, higher fatigue strength, allows lighter components to be fabricated. In addition, components having higher fatigue strength can last longer, and thus have lower life-cycle costs.

Melting Crucible Composition

Aspects of the present disclosure provide a composition of matter for crucibles that can provide improved components of titanium and titanium alloys. In one aspect, calcium monoaluminate can be provided in the form of calcium aluminate cement. Calcium aluminate cement may be referred to as a "cement" or "binder." In certain embodiments, calcium aluminate cement is mixed with alumina particulates to provide a castable investment crucible mix. The calcium aluminate cement may be greater than about 30% by weight in the castable crucible mix. In certain embodiments, the calcium aluminate cement is between about 30% and about 60% by weight in the castable crucible mix. The use of greater than 30% by weight of calcium aluminate cement in the castable crucible mix (melting crucible composition) is a further feature. The selection of the appropriate calcium aluminate cement chemistry and alumina formulation are factors in the performance of the crucible. In one aspect, a sufficient amount of calcium oxide may be provided in the crucible composition in order to minimize reaction with the titanium alloy.

In one aspect, the crucible composition, for example, the investment crucible composition, may comprise a multi-phase mixture of calcium aluminate cement and alumina particles. The calcium aluminate cement may function as a binder, for example, the calcium aluminate cement binder may provide the main skeletal structure of the crucible structure. The calcium aluminate cement may comprise a continuous phase in the crucible and provide strength during curing, firing, and melting. The crucible composition may consist of calcium aluminate cement and alumina, that is, calcium aluminate cement and alumina may comprise substantially the only components of the crucible composition, with little or no other components. In one embodiment, the present system comprises a titanium-containing article melting-crucible composition comprising calcium aluminate. In another embodiment, the melting-crucible composition further comprises oxide particles, for example, hollow oxide particles. According to other aspects, the oxide particles may be aluminum oxide particles, magnesium oxide particles, calcium oxide particles, zirconium oxide particles, titanium oxide particles, silicon oxide particles, combinations thereof, or compositions thereof. In one embodiment, the oxide particles may be a combination of one or more different oxide particles.

The melting-crucible composition can further include aluminum oxide, for example, in the form of hollow particles, that is, particles having a hollow core or a substantially hollow core substantially surrounded by an oxide. These hollow aluminum oxide particles may comprise about 99% of aluminum oxide and have about 10 millimeter [mm] or less in outside dimension, such as, width or diameter. In one embodiment, the hollow aluminum oxide particles have about 1 millimeter [mm] or less in outside dimension, such as, width or diameter. In another embodiment, the aluminum oxide comprises particles that may have outside dimensions that range from about 10 microns [μm] to about 10 millimeter [mm]. In certain embodiments, the hollow oxide particles may comprise hollow alumina spheres (typically greater than 100 microns in diameter). The hollow alumina spheres may be incorporated into the melting-crucible composition, and the hollow spheres may have a range of geometries, such as, round particles, or irregular aggregates. In certain embodiments, the alumina may include both round particles and hollow spheres. In one aspect, these geometries were found to increase the fluidity of the investment crucible mixture. The aluminum oxide comprises particles ranging in outside dimension from about 10 microns to about 10,000 microns. In certain embodiments, the aluminum oxide comprises particles that are less than about 500 microns in outside dimension, for example, diameter or width. The aluminum oxide may comprise from about 0.5% by weight to about 80% by weight of the melting-crucible composition. Alternatively, the aluminum oxide comprises from about 40% by weight to about 60% by weight of the melting-crucible composition. Alternatively, the aluminum oxide comprises from about 40% by weight to about 68% by weight of the melting-crucible composition.

In one embodiment, the melting-crucible composition further comprises calcium oxide. The calcium oxide may be greater than about 10% by weight and less than about 50% by weight of the melting-crucible composition. The final crucible typically may have a density of less than 2 grams/cubic centimeter and strength of greater than 500 pounds per square inch [psi]. In one embodiment, the calcium oxide is greater than about 30% by weight and less than about 50% by weight of the melting-crucible composition. Alternatively, the calcium oxide is greater than about 25% by weight and less than about 35% by weight of the melting-crucible composition.

One aspect is a crucible for melting a titanium-containing article, comprising: a calcium aluminate cement comprising calcium monoaluminate, calcium dialuminate, and mayenite, wherein the crucible has an intrinsic facecoat of about 10 microns to about 450 microns between the bulk of the crucible and the crucible cavity. In one embodiment, the facecoat is a continuous intrinsic facecoat.

In a specific embodiment, the melting-crucible composition comprises a calcium aluminate cement. The calcium aluminate cement includes at least three phases or components comprising calcium and aluminum: calcium monoaluminate, calcium dialuminate, and mayenite. The weight fraction of calcium monoaluminate in the intrinsic facecoat may be more than 0.60 and the weight fraction of mayenite may be less than 0.10. In one embodiment, the calcium monoaluminate in the bulk of the crucible comprises a weight fraction of about 0.05 to 0.95, and the calcium monoaluminate in the intrinsic facecoat is about 0.1 to 0.90. In another embodiment, the calcium dialuminate in the bulk of the crucible comprises a weight fraction of about 0.05 to about 0.80, and the calcium dialuminate in the intrinsic facecoat is about 0.05 to 0.90. In yet another embodiment, the mayenite in the bulk of the crucible composition comprises a weight fraction of about 0.01 to about 0.30, and the mayenite in the intrinsic facecoat is about 0.001 to 0.05.

The exact composition of the bulk of the crucible and the intrinsic facecoat may differ. For example, the calcium monoaluminate in the bulk of the crucible comprises a weight fraction of about 0.05 to 0.95, and the calcium monoaluminate in the intrinsic facecoat is about 0.1 to 0.90; the calcium dialuminate in the bulk of the crucible comprises a weight fraction of about 0.05 to about 0.80, and the calcium dialuminate in the intrinsic facecoat is about 0.05 to 0.90; and wherein the mayenite in the bulk of the crucible composition comprises a weight fraction of about 0.01 to about 0.30, and the mayenite in the intrinsic facecoat is about 0.001 to 0.05.

The weight fraction of calcium monoaluminate in the calcium aluminate cement may be more than about 0.4, and the weight fraction of mayenite in the calcium aluminate cement may be less than about 0.15. In another embodiment, the calcium aluminate cement is more than 30% by weight of the melting-crucible composition. In one embodiment, the calcium aluminate cement has a particle size of about 50 microns or less.

In one embodiment, the weight fractions of these phases that are suitable in the cement of the bulk of the crucible are 0.05 to 0.95 of calcium monoaluminate, 0.05 to 0.80 of calcium dialuminate, and 0.01 to 0.30 of mayenite. In one embodiment, the weight fractions of these phases in the facecoat of the crucible are 0.1-0.90 of calcium monoaluminate, 0.05-0.90 of calcium dialuminate, and 0.001-0.05 of mayenite. In another embodiment, the weight fraction of calcium monoaluminate in the facecoat is more than about 0.6, and the weight fraction of mayenite is less than about 0.1. In one embodiment, the weight fraction of calcium monoaluminate in the cement of the bulk of the crucible is more than about 0.5, and weight fraction of mayenite is less than about 0.15.

In one embodiment, the calcium aluminate cement has a particle size of about 50 microns or less. A particle size of less than 50 microns is preferred for three reasons: first, the fine particle size is believed to promote the formation of hydraulic bonds during crucible mixing and curing; second, the fine particle size is understood to promote inter-particle sintering during firing, and this can increase the crucible strength; and third, the fine particle size is believed to improve the surface finish of the crucible and this helps delivery of the melt from the crucible. The calcium aluminate cement may be provided as powder, and can be used either in its intrinsic powder form, or in an agglomerated form, such as, as spray dried agglomerates. The calcium aluminate cement can also be pre-blended with fine-scale (for, example, less than 10 micron in size) alumina. The fine-scale alumina is believed to provide an increase in strength due to sintering during high-temperature firing. In certain instances, larger-scale alumina (that is, greater than 10 microns in size) may also be added with or without the fine-scale alumina. In a particular embodiment, approximately 80% of the calcium aluminate cement has a particle size of less than about 10 microns.

The hollow alumina particles serve at least two functions: [1] they reduce the density and the weight of the crucible, with minimal reduction in strength; strength levels of approximately 500 psi and above are obtained, with densities of approximately 2 g/cc and less; and [2] they reduce the elastic modulus of the crucible and help to provide compliance during heating of the crucible during the melting cycle.

Calcium Aluminate Cement Composition

As set forth herein, the calcium aluminate cement comprises calcium monoaluminate. In one embodiment, the calcium aluminate cement can include calcium monoaluminate and calcium dialuminate. In another embodiment, the calcium aluminate cement can include calcium monoaluminate and mayenite.

In a particular embodiment, the calcium aluminate cement used in certain aspects can typically comprise three phases or components of calcium and aluminum: calcium monoaluminate, calcium dialuminate, and mayenite. Calcium monoaluminate is a hydraulic mineral present in calcium alumina cement. Calcium monoaluminate's hydration contributes to the high early strength of the investment crucible. Mayenite is desirable in the cement because it provides strength during the early stages of crucible curing due to the fast formation of hydraulic bonds. The mayenite is, however, typically removed during firing/heat treatment of the crucible prior to melting.

In one aspect, the initial calcium aluminate cement formulation is typically not at thermodynamic equilibrium after firing in the cement manufacturing kiln. However, after crucible making and high-temperature firing, the crucible composition moves towards a thermodynamically stable configuration, and this stability is advantageous for the subsequent melting process. In one embodiment, the weight fraction of calcium monoaluminate in the cement is greater than 0.5, and weight fraction of mayenite is less than 0.15. The mayenite is incorporated in the crucible in both the bulk of the crucible and the facecoat because it is a fast curing calcium aluminate and it is believed to provide the bulk of the crucible and the facecoat with strength during the early stages of curing. Curing may be performed at low temperatures, for example, temperatures between 15 degrees Celsius and 40 degrees Celsius because the fugitive wax pattern is temperature sensitive and loses its shape and properties on thermal exposure above about 35 degrees C. It is preferred to cure the crucible at temperatures below 30 degrees C.

The calcium aluminate cement may typically be produced by mixing high purity alumina with high purity calcium oxide; the mixture of compounds is typically heated to a high temperature, for example, temperatures between 1000 and 1500 degrees C. in a furnace or kiln and allowed to react.

Further, the calcium aluminate cement is designed and processed to have a minimum quantity of impurities, such as, minimum amounts of silica, sodium and other alkali, and iron oxide; these minimum values of impurities ensure minimum contamination of the melt by the crucible. In one aspect, the target level for the calcium aluminate cement is that the sum of the $Na_2O$, $SiO_2$, $Fe_2O_3$, and $TiO_2$ is less than about 2 weight percent. In one embodiment, the sum of the $Na_2O$, $SiO_2$, $Fe_2O_3$, and $TiO_2$ is less than about 0.05 weight percent.

In one aspect, a calcium aluminate cement with bulk alumina concentrations over 35% weight in alumina ($Al_2O_3$) and less than 65% weight calcium oxide is provided. In a related embodiment, this weight of calcium oxide is less than 50%. In one example, the maximum alumina concentration of the cement may be about 85% (for example, about 15% CaO). In one embodiment, the calcium aluminate cement is of high purity and contains up to 70% alumina. The weight fraction of calcium monoaluminate may be maximized in the fired crucible prior to melting. A minimum amount of calcium oxide may be required to minimize reaction between the alloy that is being melted and the crucible. If there is more than 50% calcium oxide in the cement, this can lead to phases such as mayenite and tricalcium aluminate, and these do not perform as well as the calcium monoaluminate during melting.

The preferred range for calcium oxide is less than about 50% and greater than about 10% by weight.

As noted above, the three phases in the calcium aluminate cement/binder in the crucible are calcium monoaluminate, calcium dialuminate, and mayenite. The calcium monoaluminate in the cement that generates the facecoat has three advantages over other calcium aluminate phases: 1) The calcium monoaluminate is incorporated in the crucible because it has a fast curing response (although not as fast as mayenite) and it is believed to provide the crucible with strength during the early stages of curing. The rapid generation of crucible strength provides dimensional stability of the melting crucible. 2) The calcium monoaluminate is chemically stable with regard to the titanium and titanium aluminide alloys that are being melted. The calcium monoaluminate is preferred relative to the calcium dialuminate, and other calcium aluminate phases with higher alumina activity; these phases are more reactive with titanium and titanium aluminide alloys that are being cast. 3) The calcium monoaluminate and calcium dialuminate are low expansion phases and are understood to reduce the formation of high levels of stress in the crucible during curing, dewaxing, and subsequent melting.

The Facecoat

In certain embodiments, the crucible further includes an intrinsic facecoat disposed between the bulk of the crucible and the crucible cavity. The intrinsic facecoat can either be a continuous intrinsic facecoat or a non-continuous facecoat. The crucible is designed to contain phases that provide improved crucible strength during crucible making, and the facecoat is designed to provide increased resistance to reaction during melting. A melting crucible composition, a facecoat composition, and preferred constituent phases for the facecoat and the bulk of the crucible, have been identified that provide crucibles with improved properties, which can be used to melt titanium and titanium alloys for producing castings with improved properties.

The facecoat is defined as the region of the crucible adjacent to the internal surface, or crucible cavity in the crucible. In one embodiment, the facecoat is generally considered to be a region about 100 microns thick. In order to be more effective, the facecoat is continuous. The region behind the facecoat and further away from the crucible cavity is referred to as the bulk of the crucible.

One aspect is a facecoat composition of a crucible that is used for melting and casting a titanium-containing article, the facecoat composition comprising: calcium monoaluminate, calcium dialuminate, and mayenite, wherein the facecoat composition is an intrinsic facecoat, is about 10 microns to about 450 microns thick, and is located between the bulk of the crucible and the surface of the crucible that opens to the crucible cavity. In a particular embodiment, the facecoat of the crucible can be between about 10 microns and about 200 microns thick. The facecoat comprises, in one example, calcium aluminate with a particle size of less than about 50 microns.

The use of an intrinsic facecoat has advantages over the use of an extrinsic facecoat. Specifically, extrinsic facecoats in molds that are used for casting, such as yttria or zircon facecoats, can degenerate, crack, and spall during mold processing and casting, specifically higher pressure casting. Extrinsic facecoats are applied, for example, to the removable pattern before the crucible or mold is formed around the removable pattern. The pieces of facecoat that become detached from the extrinsic facecoat during melting can become entrained in the casting when the crucible is discharged and the mold is filled with molten metal, and the ceramic facecoat becomes an inclusion in the final part. The inclusion reduces the mechanical performance of the component that is produced from the casting.

In one embodiment, the intrinsic facecoat composition for melting crucibles, and a bulk crucible composition, together provide improved cast components of titanium and titanium alloys. In one embodiment, the crucible comprises calcium aluminate cement and alumina particles. In one example, the calcium aluminate cement serves two functions. First the cement generates an intrinsic facecoat in the cavity of the crucible that is generated by removal of a fugitive pattern, and second it acts as a binder between the alumina particles in the bulk of the crucible behind the facecoat. In one embodiment, the bulk composition range for CaO in the crucible is between 10 and 50 weight percent. In one embodiment, the composition of CaO in the facecoat is between 15 and 40 weight percent.

The crucible may comprise the bulk of the crucible and an intrinsic facecoat, with the bulk of the crucible and the intrinsic facecoat having different compositions, and the intrinsic facecoat comprising calcium aluminate with a particle size of less than about 50 microns. The crucible may comprise the bulk of the crucible and an intrinsic facecoat, wherein the bulk of the crucible and the intrinsic facecoat have different compositions and wherein the bulk of the crucible comprises alumina particles larger than about 50 microns. The crucible, in one example, comprises the bulk of the crucible and an intrinsic facecoat, wherein the bulk of the crucible comprises alumina particles larger than about 50 microns and the intrinsic facecoat comprises calcium aluminate particles less than about 50 microns in size.

The present disclosure provides a melting crucible composition and a melting and casting process that can provide improved components of titanium and titanium alloys. In one embodiment, the crucible is constructed using calcium aluminate cement, or binder, and alumina particles. In an embodiment, the crucible contains an intrinsic facecoat between the bulk of crucible and the crucible cavity. The size of the particles in the intrinsic facecoat is typically less than 50 microns. The size of the particles in the bulk of the crucible can be larger than 50 microns. In one embodiment, the size of the particles in the bulk of the crucible is greater than 1 mm. In one embodiment, the size of the particles in the intrinsic facecoat is less than 50 microns, and the size of the particles in the bulk of the crucible are more than 50 microns. Generally, the facecoat is a continuous intrinsic facecoat, allowing it to be more effective.

The facecoat may have less alumina and more calcium aluminate cement than the bulk of the crucible. The intrinsic facecoat may have, by weight fraction, at least 20 percent more calcium monoaluminate than the bulk of the crucible. The intrinsic facecoat may have, by weight fraction, at least 20 percent less alumina than the bulk of the crucible. The intrinsic facecoat may have, by weight fraction, at least 50 percent less mayenite than the bulk of the crucible. In one embodiment, the intrinsic facecoat may have, by weight fraction, at least 20 percent more calcium monoaluminate, at least 20 percent less alumina, and at least 50 percent less mayenite than does the bulk of the crucible. The weight fraction of calcium monoaluminate in the intrinsic facecoat may be more than 0.60 and the weight fraction of mayenite may be less than 0.10. In one example, the calcium monoaluminate in the intrinsic facecoat comprises a weight fraction of 0.1 to 0.9; the calcium dialuminate in the intrinsic facecoat comprises a weight fraction of 0.05 to 0.90; and the mayenite in the intrinsic facecoat comprises a weight fraction of 0.001 to 0.05. The increased weight fraction of calcium monoaluminate in the intrinsic facecoat reduces the rate of reaction of the molten alloy with the crucible during melting. In another embodiment, the increased weight fraction of calcium monoaluminate and dialuminate in the intrinsic facecoat reduces the rate of reaction of the molten alloy with the crucible during melting.

In certain embodiments, the constituent phases of the facecoat, as well as the constituent phases of the bulk of the crucible, are important to the properties of the melt that is produced for casting. As disclosed herein, the facecoat of the crucible provides minimum reaction with the alloy during melting, and as a result the crucible provides castings with the required component properties. External properties of the casting include features such as shape, geometry, and surface finish. Internal properties of the casting include mechanical properties, microstructure, and defects (such as pores and inclusions) below a critical size.

With respect to constituent phases of the facecoat of the crucible and the bulk of the crucible, calcium monoaluminate is desirable for at least two reasons. First, calcium monoaluminate promotes hydraulic bond formation between the cement particles during the initial stages of crucible making, and this hydraulic bonding provides crucible strength during crucible construction. Second, calcium monoaluminate experiences a very low rate of reaction with titanium and titanium aluminide based alloys.

In one embodiment, the facecoat comprises calcium monoaluminate, calcium dialuminate, and mayenite, and alumina. In one embodiment, the size of the particles in the facecoat is less than 50 microns. In the facecoat, the combination of calcium monoaluminate and calcium dialuminate is more than 50 weight percent, and the alumina concentration is less than 50 weight percent. In one embodiment, there is more than 30 weight percent calcium monoaluminate in the facecoat. The region behind the facecoat and further away from the crucible cavity is referred to as the bulk of the crucible. In the bulk of the crucible, in one embodiment, the combination of calcium monoaluminate and calcium dialuminate is less than 50 weight percent, and the alumina concentration in the bulk of the crucible is greater than 50 weight percent. In another embodiment, the size of the particles in the intrinsic facecoat is less than 50 microns.

The calcium aluminate cement is referred to as a cement or binder, and in one embodiment, it is mixed with alumina particulate to make a castable investment crucible mix. The calcium aluminate cement is typically>30% by weight in the castable investment crucible mix; the use of this proportion of calcium aluminate cement is a feature of the present system because it favors a reduced level of interaction between the crucible and the melt. Applicants found that the selection of the correct calcium aluminate cement chemistry and alumina formulation are important in determining the performance of the crucible.

In one embodiment, the facecoat comprises calcium aluminate cement with a particle size less than about 50 microns. In another embodiment, the particle size of the calcium aluminate cement is less than about 10 microns. In one example, the bulk of the crucible has particles greater than 50 microns in size and can contain alumina.

The initial cement slurry is mixed to have a viscosity of between 50 and 150 centipoise. In one embodiment, viscosity range is between 80 and 120 centipoise. If the viscosity is too low, the slurry will not maintain all the solids in suspension, and settling of the heavier particles will occur and lead to segregation during curing, and an intrinsic facecoat will not be formed. If the viscosity is too high, the calcium aluminate particles cannot partition to the fugitive pattern, and the intrinsic facecoat will not be formed. The final slurry with the calcium aluminate cement and the alumina particles is mixed to have a viscosity of between approximately 1000 and 8000 centipoise. In one embodiment, this final slurry viscosity range is between 2000 and 6000 centipoise. If the final slurry/mix viscosity is too high, the final slurry mix will not flow around the fugitive pattern, and the internal cavity of the crucible will not be suitable for melting the final required part. If the final slurry mix viscosity is too low, settling of the heavier particles will occur during curing, and the crucible will not have the required uniform composition throughout the bulk of the crucible.

The investment crucible can include a multi-phase mixtures of fine-scale (<50 microns) calcium aluminate cement particles, fine-scale (<50 microns) alumina particles, and larger scale (>100 microns) alumina particles. The intrinsic facecoat does not contain any alumina particles greater than 50 microns. The intrinsic facecoat does not contain any calcium aluminate cement particles greater than 50 microns. It is considered that the intrinsic facecoat is formed because the fine-scale cement particles in suspension in the water-based investment mix partition preferentially to the fugitive/wax pattern during crucible making, and form an intrinsic facecoat layer that is enriched in the fine-scale calcium aluminate cement particles (<50 microns), and alumina particles. In one embodiment, there are no large-scale alumina particles (>50 microns) in the intrinsic facecoat. The slurry viscosity and the percentage of solids are factors in forming the intrinsic facecoat. The absence of large-scale (>100 micron) particles in the intrinsic facecoat improves the surface finish of the crucible. The increased weight fraction of calcium monoaluminate and dialuminate in the intrinsic facecoat reduces the rate of reaction of the molten alloy with the crucible during melting.

In the bulk of the crucible, the calcium aluminate cement is the binder, and the binder is considered the main skeleton of the bulk, or crucible structure behind the facecoat.

It is the continuous phase in the crucible and provides strength during curing, and melting. In one embodiment, the bulk of the crucible composition comprises fine-scale (<50 microns) calcium aluminate cement particles, and larger scale (>100 microns) alumina particles. In another embodiment, the facecoat composition comprises fine-scale calcium aluminate cement (<50 microns).

The calcium aluminate cement that makes up the intrinsic facecoat comprises at least three phases; calcium monoaluminate, calcium dialuminate, and mayenite. In one embodiment, the facecoat can also contain fine-scale (<50 microns) alumina particles. In another embodiment, the bulk of the crucible behind the facecoat comprises calcium monoaluminate, calcium dialuminate, mayenite, and alumina. The alumina can be incorporated as alumina particles, for example hollow alumina particles. The particles can have a range of geometries, such as round particles, or irregular aggregates. The alumina particle size can be as small as 10 microns and as large as 10 mm.

In one embodiment, the alumina includes both round particles and hollow particles, since these geometries increase the fluidity of the investment crucible mixture. Typically the alumina particle size in the bulk of the crucible is greater than 50 microns. The fluidity impacts the manner in which the cement partitions to the fugitive pattern (such as a wax) during pouring and setting of the investment crucible mix around the fugitive pattern. If the viscosity of the initial cement mix is too low, the slurry will not maintain all the solids in suspension, and settling of the heavier particles will occur and lead to segregation during curing, and an intrinsic facecoat will not be formed. If the viscosity of the initial cement mix is too high, the calcium aluminate particles cannot partition to the fugitive pattern, and the intrinsic facecoat will not be formed. If the final mix viscosity is too high, the final slurry mix will not flow around the fugitive pattern, and air will be trapped between the slurry mix and the pattern, and the internal cavity of the crucible. If the final slurry mix viscosity is too low, settling of the heavier particles will occur during curing, and the crucible will not have the required uniform composition throughout the bulk of the crucible, and the quality of the resulting crucible will be compromised.

The calcium aluminate cement particulate that generates the facecoat typically has a particle size of less than 50 microns. A particle size of less than 50 microns has several advantages, including: first, the fine particle size promotes the formation of hydraulic bonds during crucible mixing and curing, second the fine particle size can promote inter-particle sintering during firing, and this can increase the crucible strength, and third, the fine particle size improves surface finish of the crucible cavity. The calcium aluminate cement powder can be used either in its intrinsic form, or in an agglomerated form, such as spray dried agglomerates. The calcium aluminate cement can also be pre-blended with fine-scale (<10 micron) alumina before mixing with larger-scale alumina; the fine-scale alumina can provide an increase in strength due to sintering during high-temperature firing. However, if the alumina particles partition to the intrinsic facecoat, the refractory properties of the crucible can be reduced.

For example, if the alumina particles partition to the intrinsic facecoat, such that the intrinsic facecoat has more alumina than the bulk of the crucible, the molten alloy will react with the alumina in an undesirable way and generate gas bubbles that create surface defects and defects within the casting itself. The properties of the resulting article, such as strength and fatigue strength, are reduced. The presently disclosed methods allow for the formation of an intrinsic facecoat that has significantly less alumina in the intrinsic facecoat than in the bulk of the crucible.

The treatment of the facecoat and the crucible from room temperature to the final firing temperature can also be important, specifically the thermal history and the humidity profile. The heating rate to the firing temperature, and the cooling rate after firing are very important. If the facecoat and the crucible are heated too quickly, they can crack internally or externally, or both; facecoat and crucible cracking prior to casting is highly undesirable, it will generate defects in the subsequent casting. In addition, if the crucible and facecoat are heated too quickly the facecoat of the crucible can crack and spall off; this can lead to undesirable inclusions in the final casting in the worst case, and poor surface finish, even if there are no inclusions. If the facecoat and the crucible are cooled too quickly after reaching the maximum crucible firing temperature, the facecoat or the bulk of the crucible can also crack internally or externally, or both.

The percentage of solids of the initial cement mix and the percentage of solids of the final crucible mix have important effects on the crucible structure and the ability to form an intrinsic facecoat within the crucible, as will be described in the following paragraphs. The percentage of solids is defined as the total solids in the mix divided by the total mass of the liquid and solids in the mix, described as a percentage. In one embodiment, the percentage of solids in the initial calcium aluminate-liquid cement mix is about 60 percent to 80 percent.

If the percentage of solids in the initial cement slurry is less than about 60 percent, then the cement particles will not remain in suspension, and during curing of the crucible the cement particles will separate from the water and the composition will not be uniform throughout the crucible. In contrast, if the percentage of solids is too high in the cement (for example greater than about 78 percent), the viscosity of the final mix with the large-scale alumina will be too high (for example greater than about 85%, depending on the amount, size, and morphology of the large-scale alumina particles that are added), and the cement particles in the mix will not be able to partition to the fugitive pattern within the crucible, and the intrinsic facecoat will not be formed.

In one embodiment, the percentage of solids in the final calcium aluminate-liquid cement mix with the large-scale (meaning greater than about 50 microns in one embodiment, and greater than about 100 microns in another embodiment) alumina particles is about 75 percent to about 90 percent. In one embodiment, the percentage of solids in the final calcium aluminate-liquid cement mix with the large-scale alumina particles is about 78 percent to about 88 percent. In another embodiment, the percentage of solids in the final calcium aluminate-liquid cement mix with the large-scale alumina particles is about 78 percent to about 84 percent. In a particular embodiment, the percentage of solids in the final calcium aluminate-liquid cement mix with the large-scale alumina particles is about 80 percent.

The Crucible and Melting and Casting Methods

As described herein, one aspect is a crucible for melting titanium and titanium alloys. In one embodiment, the crucible includes a bulk and a cavity for melting the titanium and titanium alloys therein, where the bulk comprises a calcium aluminate cement as provided herein, and particularly includes a calcium aluminate cement that comprises calcium monoaluminate. In another embodiment, the crucible includes an intrinsic facecoat that is disposed about 10 microns to about 450 microns between the bulk and the cavity, with the intrinsic facecoat comprising a calcium aluminate cement that comprises calcium monoaluminate.

Figure 1B:
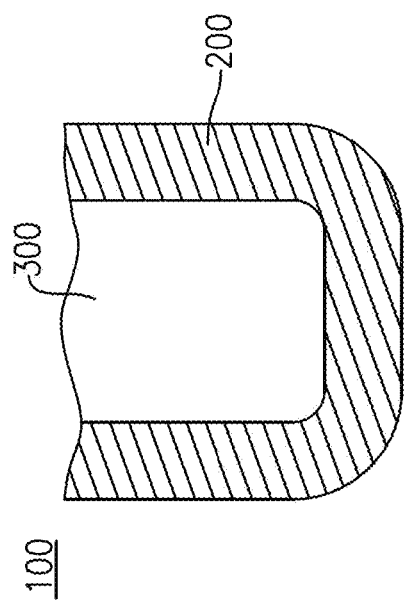

FIGS. 1A and 1B are schematics of the above embodiments of the crucible. In one embodiment, as shown in FIG. 1A, crucible 100 includes bulk 200 and cavity 300. In another embodiment, as shown in FIG. 1B, crucible 100a includes bulk 200, cavity 300, and intrinsic facecoat 400 disposed between bulk 200 and cavity 300. While FIGS. 1A and 1B show bulk portions (e.g., walls) and facecoats having a particular width relative to one another, is not meant to be limited to the relative widths as shown in FIGS. 1A and 1B. The ratio of the wall thickness to the crucible diameter can include, without limitation, ratios as small as 1:5 and as high as 1:75. For example, the ratio of the wall thickness to the crucible diameter can include, without limitation, ratios of approximately 1:10. The ratio of the facecoat thickness to the wall thickness can include, without limitation, ratios as small as 1:6, and as high as 1:75. For example, the ratio of the facecoat thickness to the wall thickness can include, without limitation, ratios of approximately 1:50.

In both embodiments of FIGS. 1A and 1B, cavity 300 can be formed using a removable crucible cavity pattern. Further aspects, characteristics, and methods of using the "removable crucible cavity patterns" are described elsewhere in the present disclosure.

An invested crucible is formed by formulating the investment mix of the ceramic components, and pouring the mix into a vessel that contains a fugitive pattern. The investment crucible formed on the pattern is allowed to cure thoroughly to form a so-called "green crucible." The intrinsic facecoat and the investment crucible are formed on the pattern and they are allowed to cure thoroughly to form this green crucible. Typically, curing of the green crucible is performed for times from 1 hour to 48 hours. Subsequently, the fugitive pattern is selectively removed from the green crucible by melting, dissolution, ignition, or other known pattern removal technique. Typical methods for wax pattern removal include oven dewax (less than 150 degrees C.), furnace dewax (greater than 150 degrees C.), steam autoclave dewax, and microwave dewaxing.

For melting titanium alloys, and titanium aluminide and its alloys, the green crucible then is fired at a temperature above 600 degrees C., for example 600 to 1650 degrees C., for a time period in excess of 1 hour, preferably 2 to 10 hours, to develop crucible strength for casting and to remove any undesirable residual impurities in the crucible, such as metallic species (Fe, Ni, Cr), and carbon-containing species. In one example, the firing temperature is at least 950 degrees C. The atmosphere of firing the crucible is typically ambient air, although inert gas or a reducing gas atmosphere can be used.

The firing process also removes the water from the crucible and converts the mayenite to calcium aluminate. Another purpose of the crucible firing procedure is to minimize any free silica that remains in the facecoat and the bulk of crucible prior to melting.

Other purposes are to increase the high temperature strength, and increase the amount of calcium monoaluminate and calcium dialuminate.

The crucible is heated from room temperature to the final firing temperature, such that the thermal history is controlled. The heating rate to the firing temperature, and the cooling rate after firing are typically regulated or controlled. If the crucible is heated too quickly, it can crack internally or externally, or both; crucible cracking prior to melting is highly undesirable. In addition, if the crucible is heated too quickly, the internal surface of the crucible can crack and spall off. This can lead to undesirable inclusions in the final casting, and poor surface finish, even if there are no inclusions. Similarly, if the crucible is cooled too quickly after reaching the maximum temperature, the crucible can also crack internally or externally, or both.

The crucible composition described herein is particularly suitable for titanium and titanium aluminide alloys. The facecoat and the bulk of the crucible composition after firing and before melting can influence the crucible properties, particularly with regard to the constituent phases. In one embodiment, for melting purposes, a high weight fraction of calcium monoaluminate in the crucible is preferred, for example, a weight fraction of 0.15 to 0.8. In addition, for melting purposes, it is desirable to minimize the weight fraction of the mayenite, for example, using a weight fraction of 0.01 to 0.2, because mayenite is water sensitive and it can provide problems with water release and gas generation during melting. After firing, the crucible can also contain small weight fractions of aluminosilicates and calcium aluminosilicates. The sum of the weight fraction of aluminosilicates and calcium aluminosilicates may typically be kept to less than 5% in the bulk of the crucible and less than 0.5% in the facecoat, in order to minimize reaction of the crucible during melting.

One aspect is a method for forming a melting crucible for melting and casting a titanium-containing article, the method comprising: combining calcium aluminate with a liquid to produce a slurry of calcium aluminate, wherein the percentage of solids in the initial calcium aluminate/liquid mixture is about 60% to about 80% and the viscosity of the slurry is about 50 to about 150 centipoise; adding oxide particles into the slurry such that the solids in the final calcium aluminate/liquid mixture with the large-scale (greater than 50 microns) oxide particles is about 75% to about 90%; introducing the slurry into a crucible mold cavity that contains a fugitive pattern; and allowing the slurry to cure in the crucible mold cavity to form a crucible of a titanium-containing article.

In certain embodiments, the melting-crucible composition comprises an investment melting-crucible composition. The melting-crucible composition comprises a near-net-shape, titanium-containing metal, melting crucible composition. In one embodiment, the melting-crucible composition comprises a melting-crucible composition for casting near-net-shape titanium aluminide articles. The near-net-shape titanium aluminide articles comprise, for example, near-net-shape titanium aluminide turbine blades.

The selection of the correct calcium aluminate cement chemistry and alumina formulation are factors in the performance of the crucible during melting. In terms of the calcium aluminate cement, it may be necessary to minimize the amount of free calcium oxide in order to minimize reaction with the titanium alloy. If the calcium oxide concentration in the cement is less than about 10% by weight, the alloy reacts with the crucible because the alumina concentration is too high, and the reaction generates undesirable oxygen concentration levels in the casting, gas bubbles, and a poor surface finish in the cast component. Free alumina is less desirable in the crucible material because it can react aggressively with titanium and titanium aluminide alloys during melting.

If the calcium oxide concentration in the cement is greater than 50% by weight, the crucible can be sensitive to pick up of water and carbon dioxide from the environment. As such, the calcium oxide concentration in the investment crucible may typically be kept below 50%. In one embodiment, the calcium oxide concentration in the bulk of the investment crucible is between 10% and 50% by weight. In one embodiment, the calcium oxide concentration in the bulk of the investment crucible is between 10% and 40% by weight. Alternatively, the calcium oxide concentration in the bulk of the investment crucible may be between 25% and 35% by weight. In one embodiment, the composition of CaO in the facecoat is between 20 and 40 percent by weight. In another embodiment, the calcium oxide concentration in the facecoat of the crucible is between 15% and 30% by weight.

If the adsorbed water level is too high, for example, greater than 0.05 weight percent, when the molten metal is generated in the crucible during melting, the water is released and it can react with the alloy. This leads to poor surface finish, gas bubbles in the casting, high oxygen concentration, and poor mechanical properties.

According to one aspect, the molten metal or alloy is poured into the mold using conventional techniques which can include gravity, countergravity, pressure, centrifugal, and other casting techniques known to those skilled in the art. Vacuum or an inert gas atmospheres can be used. For complex shaped thin wall geometries, techniques that use high pressure are preferred. After the solidified titanium aluminide or alloy casting is cooled typically to less than 650 degrees, for example, to room temperature, it is removed from the mold and finished using conventional techniques, such as, grit blasting, and polishing.

One aspect is a melting and casting method for titanium and titanium alloys comprising: obtaining an invested melting crucible composition comprising calcium aluminate and aluminum oxide, wherein the calcium aluminate is combined with a liquid to produce a slurry of calcium aluminate, and wherein the solids in the final calcium aluminate/liquid mixture with the large scale alumina is about 75% to about 90%, and wherein the resulting crucible has an intrinsic facecoat; pouring the investment crucible composition into a vessel containing a fugitive pattern; curing the investment melting crucible composition; removing the fugitive pattern from the crucible; firing the crucible; preheating the mold to a mold casting temperature; pouring molten titanium or titanium alloy into the heated mold; solidifying the molten titanium or titanium alloy and forming a solidified titanium or titanium alloy casting; and removing the solidified titanium or titanium alloy casting from the mold. In one embodiment, a titanium or titanium alloy article is claimed that is made by the casting method as taught herein.

One aspect is directed to a melting and casting method for titanium and titanium alloys comprising: obtaining an investment casting-crucible composition comprising calcium aluminate and aluminum oxide; pouring the investment casting-crucible composition into a vessel containing a fugitive pattern; curing the investment casting-crucible composition; removing the fugitive pattern from the crucible; firing the crucible; preheating the mold to a mold casting temperature; pouring molten titanium or titanium alloy from the crucible into the heated mold; solidifying the molten titanium or titanium alloy; and removing a solidified titanium or titanium alloy from the mold.

In one embodiment, the curing step is conducted at temperatures below about 30 degrees C. for between one hour to 48 hours. The removing of the fugitive pattern includes the step of melting, dissolution, ignition, oven dewaxing, furnace dewaxing, steam autoclave dewaxing, or microwave dewaxing.

Another aspect is a method for forming a melting crucible for casting a titanium-containing article. The method includes: combining calcium aluminate with a liquid, such as water, to produce a slurry of calcium aluminate in the liquid; introducing the slurry into a vessel that contains a fugitive pattern; and allowing the slurry to cure in the crucible mold cavity to form a crucible of a titanium-containing article. In one embodiment, the method further comprises, before introducing the slurry into a crucible mold cavity, introducing oxide particles, for example hollow oxide particles, to the slurry.

In one embodiment, the firing step is conducted at temperatures from about 800 degrees C. to about 1700 degrees C. for between one hour to 48 hours. A temperature range of about 1000 degrees C. to about 1700 degrees C. is more preferred, and hold times at the final firing temperature of one hour to 8 hours are more preferred.

Figure 5A:
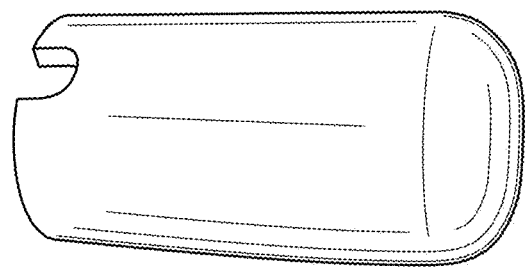
FIGS. 5A-5B are illustrations of various views of one embodiment of a crucible of the present invention.
Figure 5B:
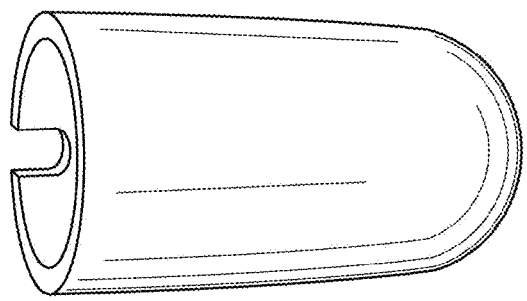

As noted previously, illustrative examples of various embodiments of crucibles are set forth in FIGS. 5A and 5B. Embodiments of the crucible curing device, crucible mold, and removable crucible cavity pattern used to make the crucible are illustrated in FIGS. 6, 7A, 7B, 7C, 8A, 8B, 8C, and 8D.

Figure 6:
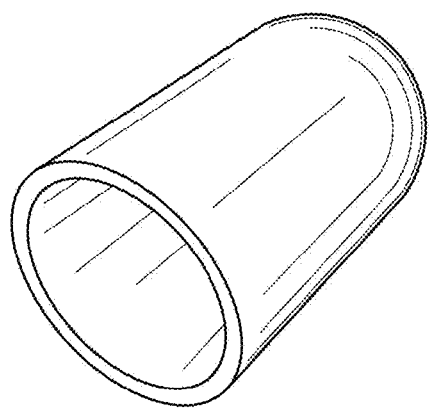
FIG. 6 is an illustration of a view of one embodiment of a crucible mold used to produce a crucible of the present invention. The crucible mold shown is of a polyurethane mold made according to the present invention. The crucible mold illustrated in FIG. 6 is configured to fit within a chamber of a crucible curing device (see FIGS. 7A-7C).

As shown in FIG. 6, in one embodiment, a crucible mold is provided that serves as a vessel that can be used to define the external surface of the crucible. In a particular embodiment, the crucible mold is configured so that it can fit and be housed or held in the chamber of the crucible curing device. While a particular shape of the mold is shown in FIG. 6, the mold is not limited to such shape. Further, the present system contemplates the use of any shaped mold that would produce a crucible that has a cavity portion for melting titanium or titanium alloys. In one embodiment, the mold can be made of a material including, but not limited to, polyurethane and the like.

Figure 7A:
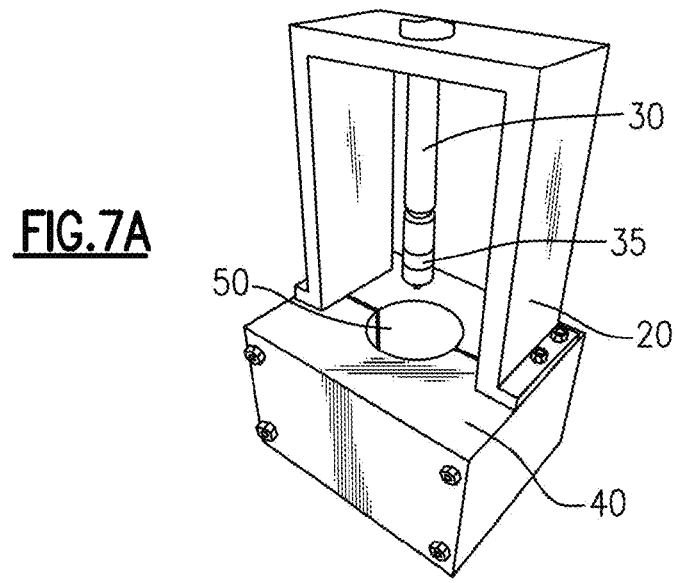
FIGS. 7A-7C are illustrations of various views of aspects of one embodiment of a crucible curing device of the present invention.
Figure 7B:
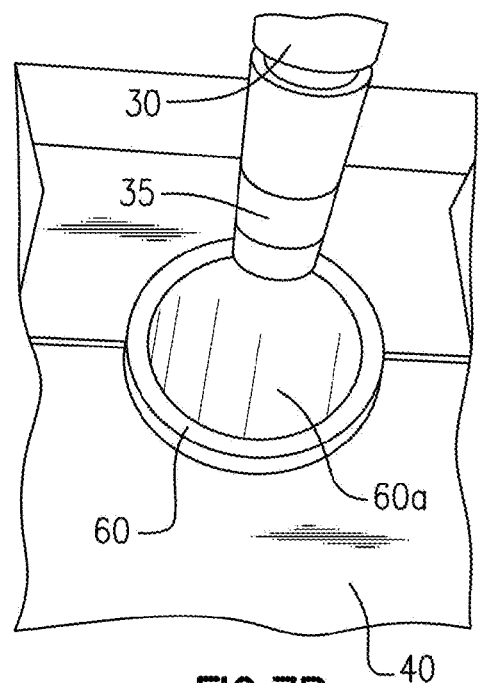
Figure 7C:
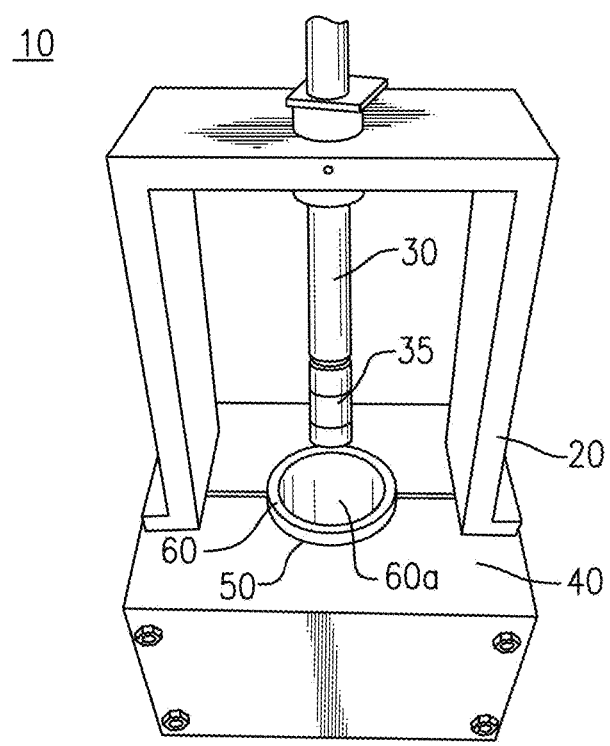

As shown in FIGS. 7A, 7B, and 7C, crucible curing device 10 is provided to include chamber 50 that works to complement crucible mold 60 (see FIGS. 7B and 7C) for the crucible. More particularly, FIGS. 7A-7C show crucible curing device 10 having base 40 that includes chamber 50 for holding crucible mold 60 therein; effector arm 30 for inserting and removing removable crucible cavity pattern 70 into and out of chamber 50, said effector arm 30 comprising adaptor portion 35 for removably coupling removable crucible cavity pattern 70 to a terminal end of effector arm 30; and support 20 for supporting and positioning effector arm 30 at a desired location above chamber 50, wherein said crucible curing device 10 is effective to produce a crucible that meets thermal shock resistance for melting titanium or titanium alloys for use in forming a titanium-containing article. As shown in FIG. 7B, crucible mold 60 includes crucible mold cavity 60 into which the crucible composition can be poured for curing of the crucible.

The position of the effector arm controls the position of the pattern in the crucible mold cavity. The position of the pattern in the crucible mold cavity controls the crucible wall thickness and the uniformity of thickness of the crucible walls. In one embodiment, the effector arm assists in positioning the pattern so that the crucible wall thickness does not vary by more than 20 percent, given that the wall thickness affects the thermal performance of the crucible. Specifically, the wall thickness and the properties of the crucible wall, such as the elastic modulus, strength, thermal conductivity, and thermal expansion coefficient, control the thermal shock resistance of the crucible.

If the crucible wall thickness is not uniform throughout all the walls of the crucible then the crucible walls will likely not heat up uniformly and this can lead to undesirable thermal stresses in the walls of the crucible and these stresses can lead to cracking of the crucible during melting before casting and leakage of the melt from the crucible.

If the crucible wall thickness is not uniform throughout all the walls of the crucible then the elastic stiffness and the fracture stress of the wall of the crucible will vary, and the mechanical response of the crucible wall to thermal cycle that the crucible experiences during melting will vary and this can lead to undesirable thermal stresses in the walls of the crucible and these stresses can lead to cracking of the crucible during melting before casting and leakage of the melt from the crucible.

In one embodiment, the wall thickness of the crucible does not vary by more than 30 percent throughout the full volume of the crucible. In another embodiment, the wall thickness of the crucible does not vary by more than 20 percent throughout the full volume of the crucible. In another embodiment, the wall thickness of the crucible does not vary by more than 15 percent throughout the full volume of the crucible.

Figure 8A:
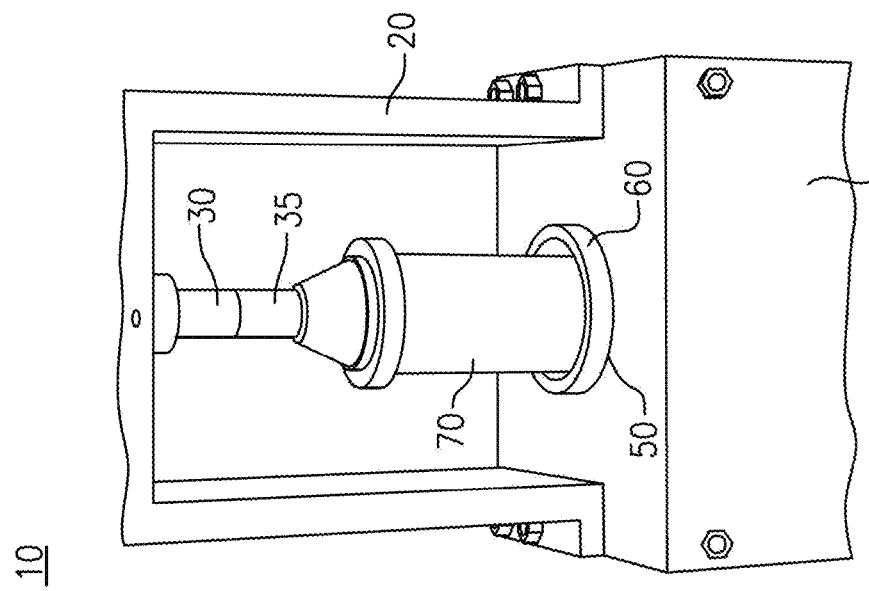
FIGS. 8A-8D are illustrations of one embodiment of a crucible curing device during the insertion and removal of a removable crucible cavity pattern from the chamber and crucible mold.
Figure 8B:
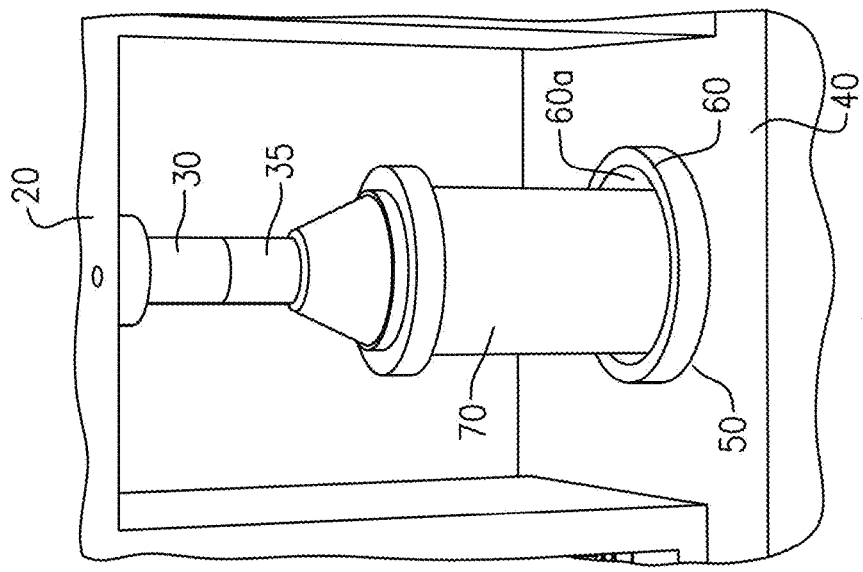
Figure 8D:
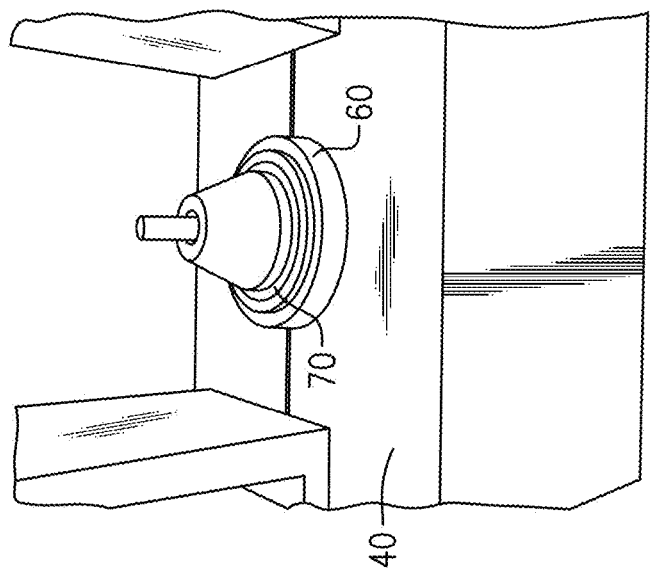
Figure 8C:
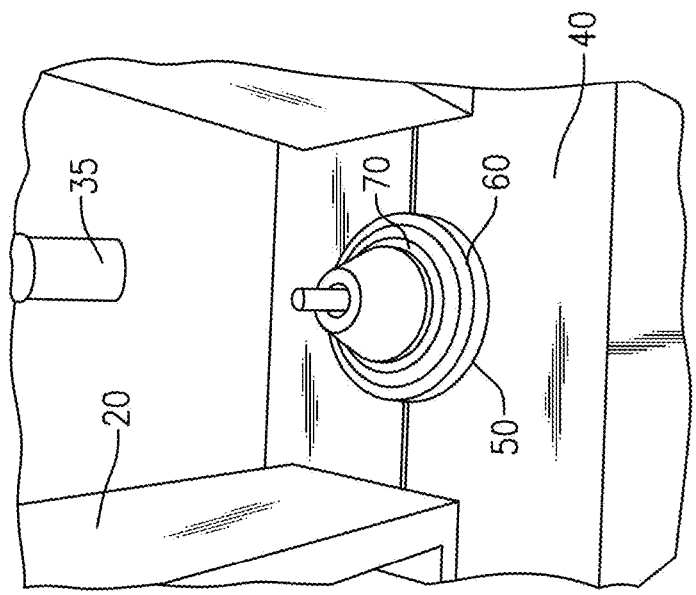

FIGS. 8A, 8B, 8C, and 8D illustrate various views of crucible curing device 10 during operation. Turning to FIGS. 8A and 8B, crucible curing device 10 is shown having removable crucible cavity pattern 70 removably coupled to effector arm 30. Crucible mold 60 is shown as housed (e.g., held) in chamber 50 of base 40 of crucible curing device 10. As shown in FIGS. 8A and 8B, at the stage in the process as shown, removable crucible cavity pattern 70 is only partially inserted into cavity 60a of crucible mold 60. As shown in FIGS. 8C and 8D, once the crucible slurry composition has been added to crucible mold 60, and once removable crucible cavity pattern 70 has been completely inserted into chamber 50 and crucible mold 60, effector arm 30 can be decoupled from removable crucible cavity pattern 70 during the curing phase.

A further aspect is a method for producing a crucible for melting titanium or titanium alloys for use in forming a titanium-containing article, said method comprising: providing a crucible curing device of the present invention; positioning a crucible mold in the chamber of the crucible curing device, said crucible mold comprising a crucible mold cavity; introducing a slurry comprising calcium aluminate cement into the crucible mold cavity of the crucible mold positioned in the chamber; and allowing the slurry to cure in the crucible mold cavity to form a crucible for use in melting titanium and titanium alloys for forming a titanium-containing article, wherein said allowing step comprises curing the slurry around the removable crucible cavity pattern inserted into the crucible mold cavity either prior to said introducing step or after said introducing step. FIGS. 8A-8D illustrates various aspects of this method.

As noted, in one embodiment, the removable crucible cavity pattern can be introduced into the chamber of the crucible curing device prior to adding the slurry into the crucible mold that is housed in the chamber. In this embodiment, the effector arm containing the removable crucible cavity pattern is lowered to a position to still allow the crucible slurry to be poured into the crucible mold. In one embodiment, the calcium aluminate containing slurry is fed into the annular gap between the mold and the removable crucible cavity pattern. Alternatively, in another embodiment, the removable crucible cavity pattern can include an inlet port for pouring the crucible slurry therethrough, which allows for the removable crucible cavity pattern to be substantially or completely inserted into the crucible mold prior to pouring the crucible slurry into the mold. In order to allow any gas contained in the crucible mold to escape during the pouring of the crucible slurry, the removable crucible cavity pattern, or the mold, can also include an exhaust port for allowing such gas to escape from the crucible mold as the crucible slurry is being poured.

The crucible slurry investment mix for use with the crucible curing device is as described herein. In one embodiment, the slurry is produced by the process as follows: combining calcium aluminate with a liquid to produce a slurry of calcium aluminate, wherein the percentage of solids in the initial calcium aluminate/liquid mixture is about 60% to about 80% and the viscosity of the slurry is about 50 to about 150 centipoise; and adding oxide particles into the slurry such that the solids in the final calcium aluminate/liquid mixture with the large-scale oxide particles is about 65% to about 90%.

Effector arms can be made of any material that can function as an adaptor for a removable crucible cavity pattern as described herein. Suitable materials for the effector arm can include, without limitation, metal, ceramic, metallic or polymeric composites, and the like. Removable crucible cavity patterns can be made of any material that can function as a fugitive pattern or as a pattern that can withstand melting when it comes into contact with the crucible slurry during curing of the crucible in the crucible mold. The removable crucible cavity pattern can be inserted into the chamber of the crucible curing device at a position suitable to produce a crucible of the sizes and shapes as described herein. The crucible mold, removable crucible cavity pattern, and crucible curing pattern comprise a tooling system effective to work together to yield concentricity of the inner and outer surfaces of the crucible to ensure control of the wall thickness.

In particular, once the removable crucible cavity pattern is in place at the desired position in or just above the chamber housing the crucible mold, the crucible composition mixture can be poured into the crucible mold and then allowed to cure under sufficient conditions, as described herein, to allow the crucible composition to cure. After curing, the removable crucible cavity pattern can be retracted from the chamber, leaving a crucible that can be taken from the crucible mold and used for melting titanium and titanium alloys, as provide herein. In another particular embodiment, the crucible composition can be poured into the crucible mold before the removable crucible cavity pattern is inserted into the crucible mold cavity. In such an embodiment, after the crucible composition is poured into the crucible mold, the effector arm can be manipulated so as to lower the removable crucible cavity pattern downward and into the crucible mold in a controlled manner to a desired position. As the removable crucible cavity pattern comes into contact with and is submerged into the crucible composition (e.g., crucible slurry), the crucible mix is extruded back into the gap between the removable crucible cavity pattern and the crucible mold cavity, excess crucible composition is moved by this physical force out of the crucible mold until the removable crucible cavity pattern is at the desired depth and location within the crucible mold. The removable crucible cavity pattern is then kept in that position until the curing process has been completed.

Without intending to limit the scope of the present invention, by way of operation, in one embodiment, the crucible curing device provides a tooling assembly that establishes the relative positions of the metal mold, the removable polyurethane crucible mold liner, and the removable crucible cavity pattern. The tooling assembly controls the alignment of the axis of symmetry of the mold and the removable crucible cavity pattern, and the relative z-axis positions of the base of the removable crucible cavity pattern and the polyurethane crucible mold liner. For an axisymmetric crucible geometry, the assembly tooling is effective to keep the crucible cavity centered in the body of the tooling in order to control the wall thickness of the sides and at the base of the resulting crucible. The removable crucible cavity pattern is positioned with regard to the x, y, and z coordinates, and, for an axisymmetric geometry, the axis of symmetry of the removal pattern is correctly aligned within acceptable tolerances with the axis of symmetry of the crucible mold cavity/removable polyurethane crucible mold liner in order to make an axisymmetric crucible with a wall thickness that is uniform within acceptable tolerances for the application.

The formed crucible may be a green crucible, and the method may further comprise firing the green crucible. In one embodiment, the melting crucible comprises an investment casting crucible, for example, for casting a titanium-containing article. In one embodiment, the titanium-containing article comprises a titanium aluminide article. In one embodiment, the investment casting-crucible composition comprises an investment casting-crucible composition for casting near-net-shape titanium aluminide articles. The near-net-shape titanium aluminide articles may comprise near-net-shape titanium aluminide turbine blades. In one embodiment, the system is directed to a crucible formed from a titanium-containing article casting-crucible composition, as taught herein. Another aspect is directed to an article formed using the aforementioned crucible.

Yet another aspect is a titanium or titanium alloy casting made by a casting method comprising: obtaining an investment casting crucible composition comprising calcium aluminate and aluminum oxide; pouring the investment casting crucible composition into a vessel containing a fugitive pattern; curing the investment casting crucible composition; removing the fugitive pattern from the crucible; firing the crucible; preheating the mold to a mold casting temperature; melting the titanium or titanium alloy in the crucible, pouring the molten alloy from the crucible into the mold; solidifying the molten titanium or titanium alloy to form the casting; and removing a solidified titanium or titanium alloy casting from the mold. In one embodiment, the present system is directed to a titanium or titanium alloy article made by the melting and casting methods taught in this application.

As the molten metals are heated higher and higher, they tend to become more and more reactive (e.g., undergoing unwanted reactions with the crucible surface). Such reactions lead to the formation of impurities that contaminate the metal parts, which result in various detrimental consequences. The presence of impurities shifts the composition of the metal such that it may not meet the desired standard, thereby disallowing the use of the cast piece for the intended application. Moreover, the presence of the impurities can detrimentally affect the mechanical properties of the metallic material (e.g., lowering the strength of the material).

One aspect is directed to a crucible composition for melting and casting a titanium-containing article, comprising calcium aluminate. The crucible composition further comprises hollow alumina particles. The article may comprise a metallic article. In one embodiment, the article comprises a titanium aluminide-containing article. In another embodiment, the article comprises a titanium aluminide turbine blade. In yet another embodiment, the article comprises a near-net-shape, titanium aluminide turbine blade. This near-net-shape, titanium aluminide turbine blade may require little or no material removal prior to installation in the operating application, such as a gas turbine or aircraft engine.

EXAMPLES

The present invention, having been generally described, may be more readily understood by reference to the following examples, which are included merely for purposes of illustration of certain aspects and embodiments of the present invention, and are not intended to limit the present invention in any way.

Figure 2A:
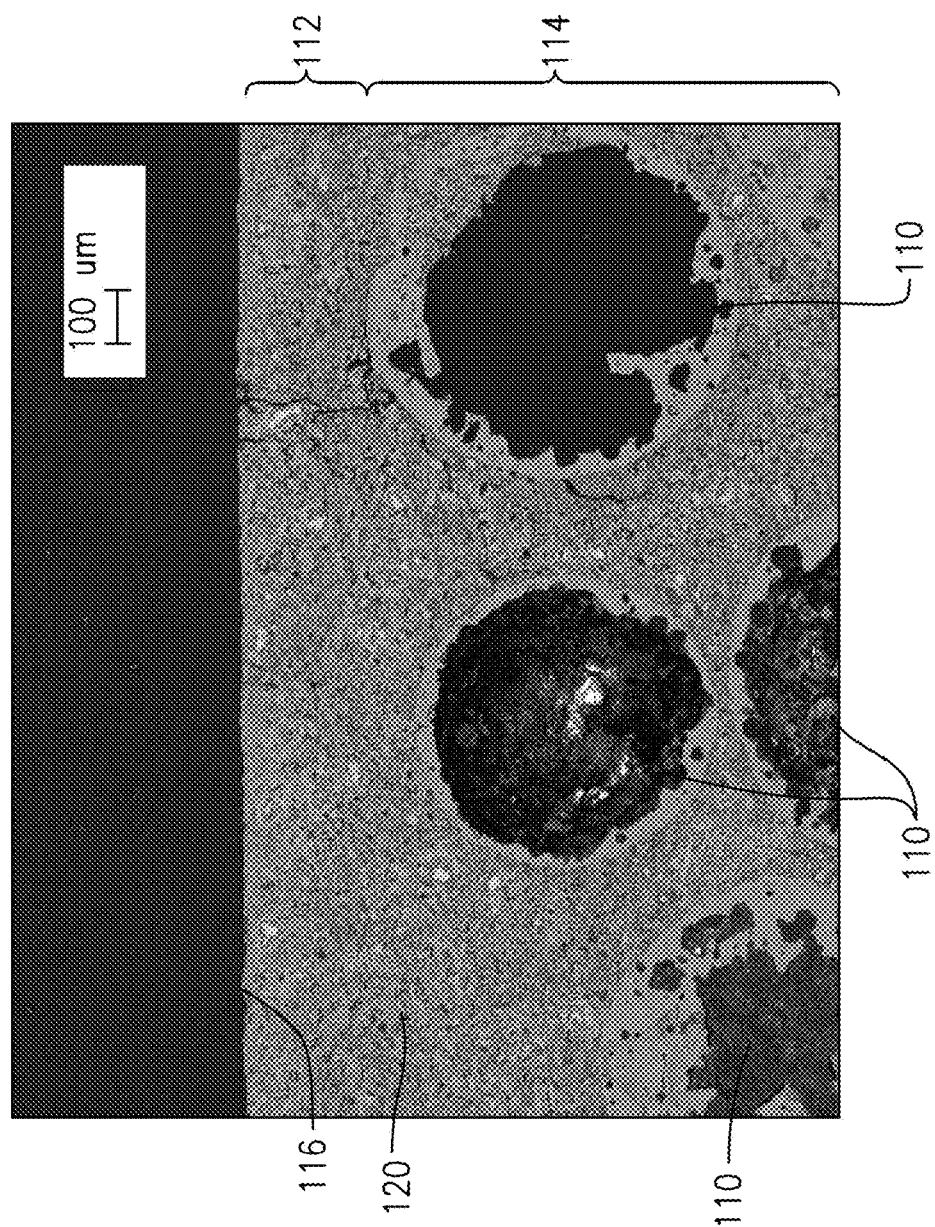
FIGS. 2A-2B are photomicrographs (at 50× magnification; bar marker indicates 100 microns) of cross-sectional views of the microstructure of various embodiments of a crucible in accordance with the description herein. The photomicrographs were taken of examples of the crucible microstructure after high temperature firing with the backscattered electron imaging scanning electron microscope images of the cross section of the crucible fired at 1000 degrees Celsius.
Figure 2B:
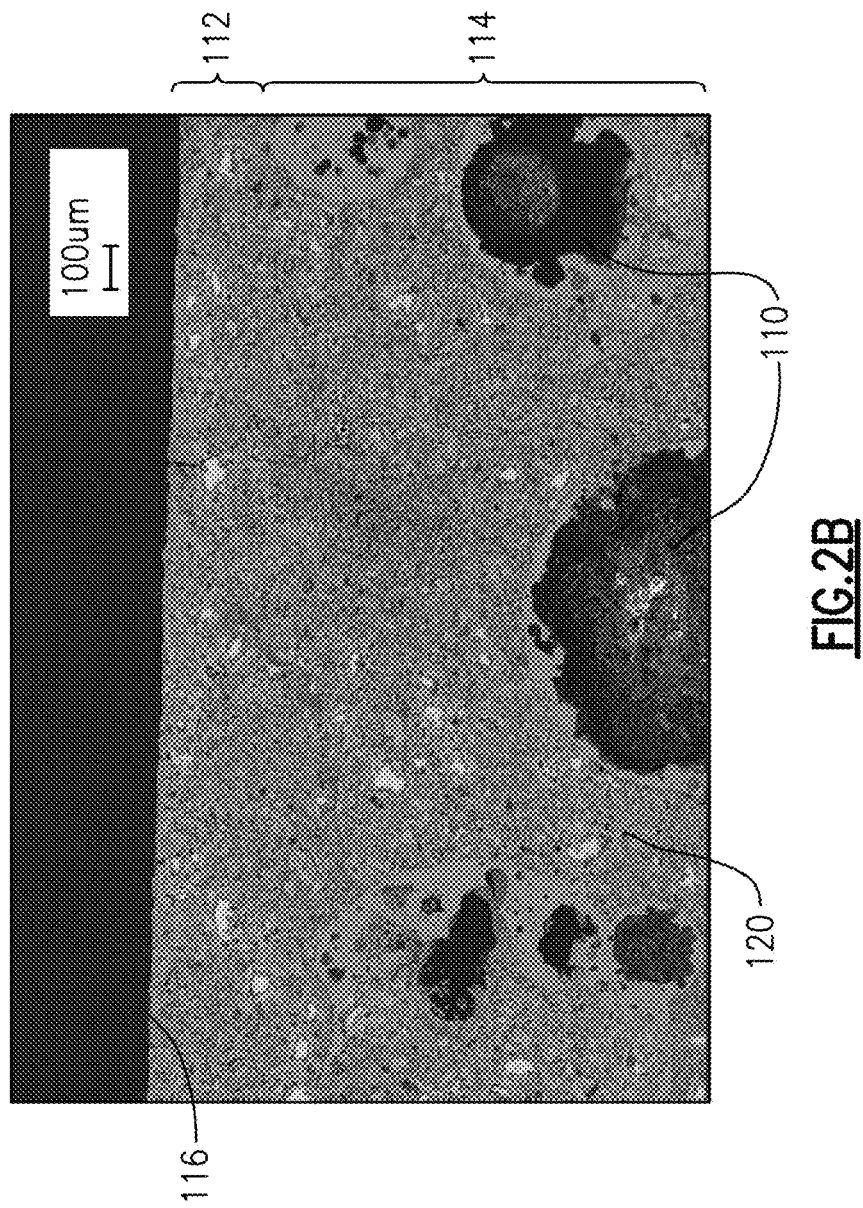

FIGS. 2A-2B show one example of the crucible microstructure after high temperature firing. The backscattered electron scanning electron microscope images of the cross section of the crucible fired at 1000 degrees Celsius are shown, wherein FIGS. 2A-2B point to hollow alumina particles 110 present, crucible intrinsic facecoat 112, bulk 114 of the crucible, and internal surface 116 of the crucible opening up to the crucible cavity. FIGS. 2A-2B also point to calcium aluminate cement 120, and more particularly to fine-scale calcium aluminate cement 120, which provide the facecoat and the skeleton structure of the bulk of the crucible. In one example the calcium aluminate cement comprises calcium monoaluminate and calcium dialuminate.

Figure 3:
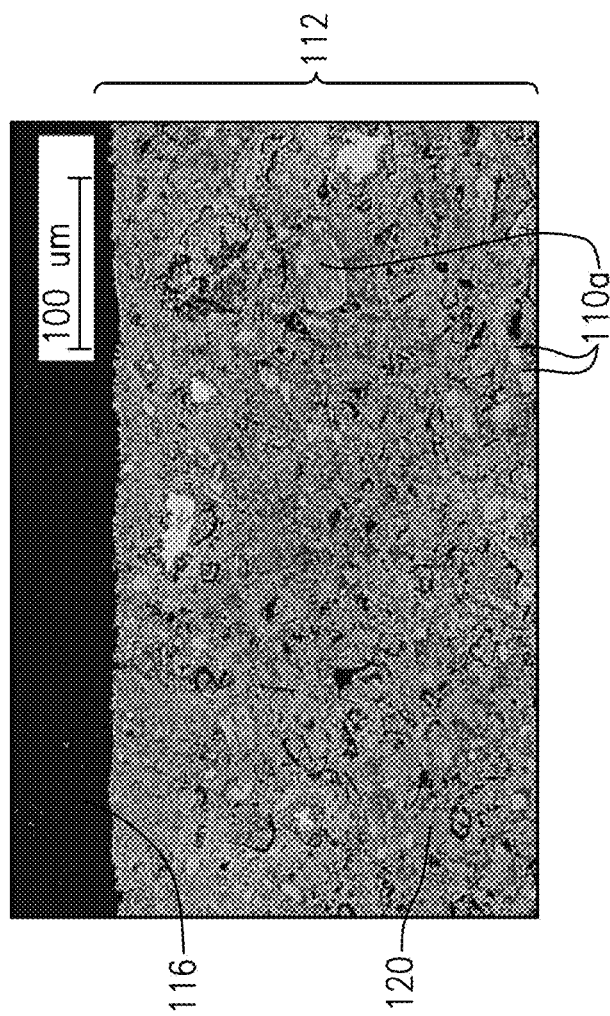
FIG. 3 is a photomicrograph (at 250× magnification; bar marker indicates 100 microns) of a cross-sectional view of the microstructure of an embodiment of a crucible in accordance with the description herein. The photomicrograph was taken of an example of the crucible microstructure after high temperature firing with the backscattered electron imaging scanning electron microscope images of the cross section of the crucible fired at 1000 degrees Celsius.

FIG. 3 shows one example of the crucible facecoat microstructure after high temperature firing. The backscattered electron scanning electron microscope images of the cross section of the crucible fired at 1000 degrees Celsius are shown, wherein FIG. 3 points to calcium aluminate cement 120 present as part of intrinsic facecoat 112 microstructure. FIG. 3 also points to fine-scale (less than 50 micron) alumina particles 110a, because they are different from the large scale alumina) and also shows the internal surface 116 of the crucible/crucible cavity, as well as intrinsic facecoat 112 region.

As shown in FIG. 4A, the method comprises combining calcium aluminate with a liquid to produce a slurry of calcium aluminate in the liquid 705. The percentage of solids in the initial calcium aluminate/liquid mixture is about 70% to about 80% and the viscosity of the slurry is about 50 to about 150 centipoise. In one embodiment oxide particles are added into the slurry 707 such that the solids in the final calcium aluminate/liquid mixture with the large scale (greater than 50 microns) oxide particles is about 75%-about 90%. The calcium aluminate slurry is introduced into a crucible mold cavity that contains a fugitive pattern 710. The slurry is allowed to cure in the crucible mold cavity to form a crucible.

As shown in FIG. 4B, the method comprises obtaining an investment casting crucible composition comprising calcium aluminate and aluminum oxide 725. In one example the calcium aluminate is combined with a liquid to produce a slurry of calcium aluminate, wherein the solids in the final calcium aluminate/liquid mixture with a large scale alumina is about 75% to about 90%. The investment casting crucible composition is poured into a vessel containing a fugitive pattern 730. The investment casting crucible is cured thereby providing the casting crucible composition 735. The fugitive pattern is removed from the crucible 740, and the crucible is fired. The casting mold is preheated to a mold casting temperature 745, and the molten titanium or titanium alloy is poured into the heated mold 750. The molten titanium or titanium alloy is solidified and forms a solidified titanium or titanium alloy casting 755. Finally, the solidified titanium or titanium alloy casting is removed from the mold 760.

A calcium aluminate cement was mixed with alumina to generate an investment crucible mix, and a range of investment crucible chemistries were tested. The investment mixture in one example consisted of calcium aluminate cement with 70% alumina and 30% calcia, alumina particles, water, and colloidal silica. In other examples, the invested mixture tested consisted of calcium aluminate cement with 80% alumina and 20% calcia, alumina particles, water, and colloidal silica.

In a first example, a typical slurry mixture for making an invested mix for making crucibles was made and consisted of 1200 g of 80% calcium aluminate cement, 652 g of high-purity alumina particles of a size range from 0.5-1 mm diameter, 408 g of deionized water, and 40 g of colloidal silica, Remet LP30. Other suitable colloidal silicas that were used in other embodiments included Remet SP30, Nalco 1030, Ludox. This formulation was used to produce two crucibles that were approximately 60 mm internal diameter and 150 mm long, with a wall thickness of 8 mm. The crucibles were cured, dewaxed, and fired. The crucibles that were so produced were used successfully for casting titanium aluminide components with an oxygen content of less than 5000 ppm. The crucibles also had a density of less than 2 grams per cubic centimeter. The low density can provide improved resistance to thermal shock on melting.

The ceramic mix for making the crucible was prepared by mixing the cement, water, and collodial silica in a container. It is preferred to use a high-shear form of mixing. If not mixed appropriately the cement can gel, and it will make a mix that cannot be used. When the cement was in suspension in the mixture, the larger-size alumina particles (for example 0.5-1.0 mm) were added and mixed with the cement-alumina formulation. The viscosity of the final mix is very important; it must not be too low or too high, as will be described subsequently.

After mixing, the invested mix was poured in a controlled manner into a vessel that contained the fugitive pattern, which is typically for example prepared from wax. The vessel provided the external geometry of the crucible, and the fugitive pattern generated the internal geometry (see FIGS. 7A-7C and 8A-8D for tooling and molds used to prepare crucibles). The correct pour speed is important; if it is too fast, air can be entrapped in the crucible, if it is too slow separation of the cement and the alumina particulate can occur.

The ratio of the wall thickness to the crucible diameter was approximately 1:10. The ratio of the intrinsic facecoat thickness to the wall thickness was 1:50. The intrinsic facecoat thickness was approximately 100 microns.

In a second example, two smaller crucibles were produced using a slurry mixture that consisted of 1200 g of the 80% calcium aluminate cement, 652 g of high-purity alumina bubble of a size range from 0.5-1 mm diameter, 408 g of deionized water, and 40 g of Remet LP30, colloidal silica. The alumina bubbles provide a crucible with a reduced density and improved thermal shock resistance. The weight fraction of calcium aluminate cement is 65%, and that of the alumina bubble is 35%. The two crucibles were approximately 50 mm internal diameter and 90 mm long. The crucibles were then cured and fired at a temperature of 1600 degrees celsius for 1 hour. The crucible possessed an intrinsic facecoat that consisted of calcium aluminate phases, and the facecoat thickness was approximately 100 microns. The crucibles that were so produced were used successfully for melting titanium aluminide slab castings with a good surface finish for mechanical property measurement.

The rate of reaction of the calcium aluminate phases with water controls the working time of the invested mix during crucible making; this time should be between 30 seconds and 10 minutes. If the working time of the invested crucible mix is too short, there is insufficient time to make large crucibles with thin-wall geometries. If the working time of the invested crucible mix is too long and the calcium aluminate cement does not cure sufficiently quickly, separation of the fine-scale cement and the large scale alumina can occur and this can lead to a segregated crucible in which the formulation varies and the resulting crucible properties are not uniform.

The constituent phases in the cement that make up the continuous intrinsic facecoat of the crucible, and provides the binder for the bulk of the crucible, are a feature of the present system. The three phases in the calcium aluminate cement are calcium monoaluminate ($CaAl_2O_4$), calcium dialuminate ($CaAl_4O_7$), and mayenite ($Ca_{12}Al_{14}O_{33}$), and the inventors made this selection to achieve several purposes. First, the phases must dissolve or partially dissolve and form a suspension that can support all the aggregate phases in the subsequent investment crucible making slurry. Second, the phases must promote setting or curing of the crucible after pouring. Third, the phases must provide strength to the crucible during curing, firing, and melting. Fourth, the phases must exhibit minimum reaction with the titanium alloys that is cast in the crucible. The three phases in the calcium aluminate cement/binder in the crucible and in the facecoat of the crucible are calcium monoaluminate ($CaAl_2O_4$), calcium dialuminate ($CaAl_4O_7$), and mayenite ($Ca_{12}Al_{14}O_{33}$). The mayenite is incorporated in the crucible because it is a fast curing calcium aluminate and it provides the facecoat and the bulk of the crucible with strength during the early stages of curing. Curing should be performed at low temperatures, because the fugitive wax pattern is temperature sensitive and loses its shape and properties on thermal exposure above ~35 deg C. It is preferred to cure the crucible at temperatures below 30 deg C.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the present invention may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A crucible for melting titanium and titanium alloys, comprising:
   a bulk;
   a cavity for melting titanium and titanium alloys therein; and
   an intrinsic facecoat with a thickness of about 10 microns to about 450 microns disposed between the bulk and the cavity,
   wherein said bulk and said intrinsic facecoat comprises a calcium aluminate cement comprising calcium monoaluminate.

2. The crucible as recited in claim 1, wherein the intrinsic facecoat comprises a continuous intrinsic facecoat.

3. The crucible as recited in claim 1, wherein said calcium aluminate cement further comprises calcium dialuminate, mayenite, or both calcium dialuminate and mayenite.

4. The crucible as recited in claim 1, wherein the bulk of the crucible and the intrinsic facecoat have different compositions and the intrinsic facecoat comprises calcium aluminate with a particle size of less than about 50 microns.

5. The crucible as recited in claim 1, wherein the bulk of the crucible and the intrinsic facecoat have different compositions and wherein the bulk of the crucible comprises alumina particles larger than about 50 microns.

6. The crucible as recited in claim 1, wherein the bulk of the crucible comprises alumina particles larger than about 50 microns and the intrinsic facecoat comprises calcium aluminate particles less than about 50 microns in size.

7. The crucible as recited in claim 1, wherein the intrinsic facecoat has, by weight fraction, at least 20 percent more calcium monoaluminate than does the bulk of the crucible.

8. The crucible as recited in claim 1, wherein the intrinsic facecoat has, by weight fraction, at least 20 percent less alumina than does the bulk of the crucible.

9. The crucible as recited in claim 3, wherein the intrinsic facecoat has, by weight fraction, at least 20 percent more calcium monoaluminate, at least 20 percent less alumina, and at least 50 percent less mayenite than does the bulk of the crucible.

10. The crucible as recited in claim 3, wherein the weight fraction of calcium monoaluminate in the intrinsic facecoat is more than 0.60 and the weight fraction of mayenite is less than 0.10.

11. The crucible as recited in claim 1, wherein said calcium monoaluminate in the bulk of the crucible comprises a weight fraction of about 0.05 to 0.95, and said calcium monoaluminate in the intrinsic facecoat is about 0.10 to 0.90.

12. The crucible as recited in claim 3, wherein said calcium dialuminate in the bulk of the crucible comprises a weight fraction of about 0.05 to 0.80, and said calcium dialuminate in the intrinsic facecoat is about 0.05 to 0.90.

13. The crucible as recited in claim 3, wherein the bulk of the crucible composition comprises mayenite in a weight fraction of about 0.01 to about 0.30, and the intrinsic facecoat comprises mayenite in a weight fraction of about 0.001 to 0.05.

14. The crucible composition as recited in claim 3, wherein said calcium monoaluminate in the bulk of the crucible comprises a weight fraction of about 0.05 to 0.95, and said calcium monoaluminate in the intrinsic facecoat is about 0.1 to 0.9; said calcium dialuminate in the bulk of the crucible comprises a weight fraction of about 0.05 to about 0.80, and said calcium dialuminate in the intrinsic facecoat is about 0.05 to 0.90; and wherein said mayenite in the bulk of the crucible composition comprises a weight fraction of about 0.01 to about 0.30, and said mayenite in the intrinsic facecoat is about 0.001 to 0.05.

15. The crucible as recited in claim 1, further comprising aluminum oxide particles in the bulk of the crucible that are less than about 500 microns in outside dimension.

16. The crucible as recited in claim 1, wherein the calcium aluminate cement comprises more than 30% by weight of the composition used to make the bulk and intrinsic facecoat crucible.

17. The crucible as recited in claim 1, the bulk further comprising aluminum oxide particles, magnesium oxide particles, calcium oxide particles, zirconium oxide particles, titanium oxide particles, silicon oxide particles, or combinations thereof.

18. A crucible for melting titanium and titanium alloys, comprising:
   a bulk comprising a calcium aluminate cement, said bulk comprising calcium monoaluminate and aluminum oxide particles;
   a cavity for melting titanium and titanium alloys therein; and
   an intrinsic facecoat comprising said calcium aluminate cement disposed between the bulk and the cavity,
   wherein aluminum oxide particles comprise from about 40% by weight to about 68% by weight of a composition used to make the bulk and the intrinsic facecoat of the crucible.

19. The crucible as recited in claim 1, further comprising hollow particles of aluminum oxide.

20. The crucible as recited in claim 1, further comprising more than about 10% by weight and less than about 50% by weight of the crucible composition in calcium oxide.

21. The crucible as recited in claim 1, wherein the percentage of solids in an initial calcium aluminate liquid cement mixture used to make the crucible is from about 60 to about 80%.

22. The crucible as recited in claim 1, wherein the percentage of solids in a final calcium aluminate liquid cement mixture including alumina particles larger than about 50 microns that is used to make the crucible is from about 65% to about 90%.

23. The crucible as recited in claim 1, wherein the crucible further comprises silica.

24. The crucible as recited in claim 1, wherein the crucible is configured to withstand thermal stresses resulting from melting titanium or titanium alloys in the cavity without forming at least one crack extending through the bulk and facecoat.

25. The crucible as recited in claim 24, wherein the is configured to withstand thermal stresses resulting from melting the titanium or titanium alloys within the cavity at a temperature between 1500° C. and 1700° C. for at least 1 second.

26. The crucible as recited in claim 1, wherein said bulk further comprises aluminum oxide particles, and wherein aluminum oxide particles comprise from about 40% by weight to about 68% by weight of a composition used to make the bulk and the intrinsic facecoat of the crucible.

27. The crucible of claim 18, wherein the intrinsic facecoat comprises a thickness of about 10 microns to about 450 microns between the bulk and the cavity, and wherein the intrinsic facecoat comprises calcium monoaluminate.

28. The crucible as recited in claim 18, wherein the calcium aluminate cement of the bulk of the crucible and the intrinsic facecoat have different compositions, wherein the calcium aluminate cement of the intrinsic facecoat comprises calcium aluminate with a particle size of less than about 50 microns, and wherein the bulk of the crucible comprises alumina particles larger than about 50 microns.

29. The crucible as recited in claim 27, wherein the intrinsic facecoat has, by weight fraction, at least 20 percent more calcium monoaluminate than does the bulk of the crucible.

30. The crucible as recited in claim 18, wherein the intrinsic facecoat has, by weight fraction, at least 20 percent less alumina than does the bulk of the crucible.

31. The crucible as recited in claim 18, wherein the bulk and the intrinsic facecoat further comprise mayenite, and wherein the intrinsic facecoat has, by weight fraction, at least 20 percent more calcium monoaluminate, at least 20 percent less alumina, and at least 50 percent less mayenite than does the bulk of the crucible.

32. The crucible as recited in claim 18, wherein the intrinsic facecoat further comprises mayenite, and wherein the weight fraction of calcium monoaluminate in the intrinsic facecoat is more than 0.60 and the weight fraction of mayenite is less than 0.10.

33. The crucible as recited in claim 18, wherein the bulk and the intrinsic facecoat further comprise calcium dialuminate, and wherein said calcium dialuminate in the bulk of the crucible comprises a weight fraction of about 0.05 to about 0.80, and said calcium dialuminate in the intrinsic facecoat comprises a weight fraction of about 0.05 to 0.90.

34. The crucible as recited in claim 18, wherein the aluminum oxide particles in the bulk of the crucible that are less than about 500 microns in outside dimension.

35. The crucible as recited in claim 18, wherein the aluminum oxide particles include hollow aluminum oxide particles.

36. The crucible as recited in claim 18, wherein the bulk of the crucible further comprises silica.

* * * * *